United States Patent
Kloeffer et al.

(10) Patent No.: US 7,930,681 B2
(45) Date of Patent: Apr. 19, 2011

(54) SERVICE AND APPLICATION MANAGEMENT IN INFORMATION TECHNOLOGY SYSTEMS

(75) Inventors: Michael Kloeffer, Woerth (DE); Stefan Krimmel, Muehlhausen (DE); Juergen Subat, Hockenheim (DE); Uwe Erdtmann, Wiesloch (DE); Matthias Mueller, Wiesloch (DE); Lee Downham, Schriesheim (DE)

(73) Assignee: SAP AG (DE)

( * ) Notice: Subject to any disclaimer, the term of this patent is extended or adjusted under 35 U.S.C. 154(b) by 1477 days.

(21) Appl. No.: 11/322,946

(22) Filed: Dec. 30, 2005

(65) Prior Publication Data

US 2007/0168874 A1    Jul. 19, 2007

(51) Int. Cl.
G06F 9/44 (2006.01)
G06F 11/00 (2006.01)
G06F 3/00 (2006.01)
G06F 9/46 (2006.01)
G06F 13/00 (2006.01)

(52) U.S. Cl. ........ 717/120; 717/121; 717/124; 717/127; 714/47; 714/48; 719/318

(58) Field of Classification Search ............... None
See application file for complete search history.

(56) References Cited

U.S. PATENT DOCUMENTS

| | | | |
|---|---|---|---|
| 5,436,966 A * | 7/1995 | Barrett et al. | 379/265.03 |
| 6,177,932 B1 | 1/2001 | Galdes et al. | |
| 6,199,068 B1 | 3/2001 | Carpenter | |
| 6,230,287 B1 | 5/2001 | Pinard et al. | |
| 6,272,333 B1 * | 8/2001 | Smith | 455/418 |
| 6,289,378 B1 | 9/2001 | Meyer et al. | |
| 6,304,893 B1 | 10/2001 | Gish | |
| 6,389,426 B1 | 5/2002 | Turnbull et al. | |
| 6,424,991 B1 | 7/2002 | Gish | |
| 6,434,598 B1 | 8/2002 | Gish | |
| 6,598,167 B2 | 7/2003 | Devine et al. | |
| 6,611,955 B1 | 8/2003 | Logean et al. | |
| 6,615,258 B1 | 9/2003 | Barry et al. | |
| 6,654,915 B1 | 11/2003 | Lu et al. | |
| 6,691,159 B1 | 2/2004 | Grewal et al. | |
| 6,714,976 B1 | 3/2004 | Wilson et al. | |
| 6,718,489 B1 | 4/2004 | Lee et al. | |
| 6,799,147 B1 | 9/2004 | Balasubramanian et al. | |

(Continued)

OTHER PUBLICATIONS

Office Action issued in related U.S. Appl. No. 11/322,623 on Sep. 18, 2008, 22 pages.

(Continued)

Primary Examiner — Emerson C Puente
Assistant Examiner — Jonathan R Labud
(74) Attorney, Agent, or Firm — Fish & Richardson, P.C.

(57) ABSTRACT

Systems and techniques for managing services and applications of a client system, such as an enterprise computer system, reduce the operational workload and optimize daily support process by deliverying embedded services in client system with direct connection of services into a back-end system so that back-end system processes can analyze client system information and provide detailed reports and analyses and with continuous (or regular) data exchange between client system and backend system to ensure efficient client system software processes. The embedded services can include support, operation, change and deploy, and plan and optimize services. The output of at least one of these services can be pushed to and displayed in a graphical user interface. A fact sheet provided with he graphical user interface contains on one page all the information that is needed to clearly show who is responsible for handling information technology problems, incidents, tasks, and service requests.

20 Claims, 20 Drawing Sheets

U.S. PATENT DOCUMENTS

| | | |
|---|---|---|
| 6,829,734 B1 | 12/2004 | Kreulen et al. |
| 6,859,783 B2 | 2/2005 | Cogger et al. |
| 6,892,317 B1 | 5/2005 | Sampath et al. |
| 6,930,695 B1 | 8/2005 | Pabla |
| 6,985,944 B2 | 1/2006 | Aggarwal |
| 7,003,502 B1 * | 2/2006 | Wizdo et al. .................... 706/45 |
| 7,225,139 B1 | 5/2007 | Tidwell et al. |
| 7,225,367 B2 | 5/2007 | Hashem et al. |
| 7,305,465 B2 | 12/2007 | Wing et al. |
| 7,340,038 B2 | 3/2008 | Boetje et al. |
| 7,366,731 B2 | 4/2008 | Lewis et al. |
| 7,516,450 B2 | 4/2009 | Ogura |
| 2002/0073355 A1 | 6/2002 | Cerami et al. |
| 2002/0087680 A1 | 7/2002 | Cerami et al. |
| 2002/0138571 A1 * | 9/2002 | Trinon et al. ................. 709/204 |
| 2002/0165952 A1 | 11/2002 | Sewell et al. |
| 2003/0061541 A1 | 3/2003 | Kaler et al. |
| 2003/0110248 A1 | 6/2003 | Ritche |
| 2003/0144894 A1 * | 7/2003 | Robertson et al. ................. 705/8 |
| 2003/0189600 A1 | 10/2003 | Gune et al. |
| 2004/0015953 A1 | 1/2004 | Vincent |
| 2004/0044987 A1 | 3/2004 | Kompallie et al. |
| 2004/0078695 A1 | 4/2004 | Bowers et al. |
| 2004/0088404 A1 | 5/2004 | Aggarwal |
| 2004/0117689 A1 | 6/2004 | Harper et al. |
| 2004/0123304 A1 * | 6/2004 | Black et al. ................... 719/318 |
| 2004/0187103 A1 | 9/2004 | Wickham et al. |
| 2004/0230559 A1 | 11/2004 | Newman et al. |
| 2005/0021847 A1 | 1/2005 | Rothman et al. |
| 2005/0022177 A1 | 1/2005 | McCaleb et al. |
| 2005/0033625 A1 | 2/2005 | Kline |
| 2005/0038827 A1 | 2/2005 | Hooks |
| 2005/0091640 A1 | 4/2005 | McCollum et al. |
| 2005/0097396 A1 * | 5/2005 | Wood .............................. 714/25 |
| 2005/0144526 A1 | 6/2005 | Banko |
| 2005/0172243 A1 | 8/2005 | Pabla |
| 2005/0273667 A1 | 12/2005 | Shrivastava et al. |
| 2006/0095392 A1 | 5/2006 | Arend |
| 2006/0116981 A1 | 6/2006 | Krimmel et al. |
| 2006/0191007 A1 * | 8/2006 | Thielamay ....................... 726/22 |
| 2007/0150812 A1 | 6/2007 | Hu |
| 2007/0162485 A1 | 7/2007 | Haeberle et al. |
| 2007/0174731 A1 | 7/2007 | Haeberle et al. |
| 2007/0203712 A1 | 8/2007 | Sunday et al. |
| 2008/0056476 A1 | 3/2008 | Pounds et al. |

OTHER PUBLICATIONS

Office Action issued in related U.S. Appl. No. 11/322,623 on Jul. 22, 2009; 22 pages.
Office Action issued in related U.S. Appl. No. 11/322,799 on Dec. 12, 2008, 23 pages.
Office Action issued in related U.S. Appl. No. 11/322,799 on Jul. 20, 2009, 23 pages.
Office Action issued in related U.S. Appl. No. 11/322,623 on Mar. 19, 2008, 24 pages.
Office Action issued in related U.S. Appl. No. 11/322,797 on Mar. 17, 2008, 21 pages.
Office Action issued in related U.S. Appl. No. 11/322,797 on Oct. 1, 2008, 23 pages.
Office Action issued in related U.S. Appl. No. 11/322,797 on Jan. 7, 2009, 22 pages.
Office Action issued in related U.S. Appl. No. 11/322,797 on Jun. 29, 2009, 22 pages.
Office Action issued in related U.S. Appl. No. 11/322,890 on Jun. 10, 2009, 34 pages.
Office Action issued in related U.S. Appl. No. 11/322,890 on Jun. 20, 2008, 29 pages.
Office Action issued in related U.S. Appl. No. 11/322,890 on Dec. 24, 2008, 33 pages.
Office Action issued in related U.S. Appl. No. 11/324,734 on Aug. 21, 2009, 18 pages.
SmarterTickets 1.x (SmarterTools.Com), version 1.0.1561 (Released Apr. 10, 2004).
United States Patent Office's prosecution file for U.S. Appl. No. 11/322,623; 323 pages.
United States Patent Office's prosecution file for U.S. Appl. No. 11/322,799; 302 pages.
United States Patent Office's prosecution file for U.S. Appl. No. 11/322,797; 286 pages.
United States Patent Office's prosecution file for U.S. Appl. No. 11/322,890; 291 pages.
United States Patent Office's prosecution file for U.S. Appl. No. 11/324,734; 120 pages.

* cited by examiner

Welcome, Joanne Miller

Back, Forward, Options, Help, SAP
Search | Advanced

| Home | HR Organizational Management | Personnel Administration | HR Time Administration | Time and Labor | Compensation | Payroll |

My Home
Work
News
Reports
Self-Service
Activities

⊙ Overview
○ Corporate Performance

▼ Favorites
Time Accounts
Flexible Employee List

▼ Recent
Vehicle Assignment
Cost and Cost Planning
Salary Overview

Show [All Reports ▾] grouped by [Workcenter ▾]   Expand All  Show Filter  Show Preview

| Name | Description | Author |
|---|---|---|
| ▸ HR Organizational Management | | |
| ▸ Personnel Administration | | |
| ▾ HR Time Administration | | |
| Employee Times FTE | List of employee times in Full Time Equivalents | Peter Lanham |
| ▼ Leave taken in units of FTE | Overview of employees on leave in units of FTE | |
| Leave Taken Last 12 Months | Leave taken in last 12 months | |
| Leave Taken in Org. Unit Sales | Leave Taken in Org. Unit Sales | |
| ▸ Time and Labor for Teams | | |
| ▾ Compensation | | |
| Participation Analysis according to Organization | Analytical report of employees participation according to Organization Criteria | |
| Cost Analysis according to Organization Criteria | Analytical report of costs per organizational unit | |
| Two Cost Plans Compared | Cost Comparison between two cost plans | |
| Annual Salary | Overview of annual salary in organizational units and/or time periods | |
| Comparison of Annual Salaries | Comparison of Salaries Previous / Current Year for an employee | |
| Employees in Pay Grades / Pay Grade Levels | List of employees with their pay grades/pay grade levels | |
| ▾ Payroll | | |
| Annual Wage Types Overview | Annual overview of wage types per org. unit | |

[◀][◀] [20] of 30 rows [▶][▶][□]

Leave Taken in Unit of FTE
Overview of employees on leave in units of FTE
Last Modified: Monday December 6, 2004
Key Fields: Employee - Full Time or Part Time - Organizational Unit

A1S Fact Sheet 1050

Options  Help

1052
Contacts & Contracts

Type of Service Contract: Premium
More...  Configure...

| | |
|---|---|
| Partner for Operation: BBS | Support Contact: SAP |
| PartnerEdge Status: Associate | Emergency Contact Number: +49 6227 742888 |
| Contact Person: Indira Miggs | Degree of SLA Fulfillment: 98% |
| Degree of SLA Fulfillment: 86% | More...  Configure... |

More...  Configure...

1054
IT Organization

Working Hours: Mo-Fr 08:00-17:00
Primary Contact: Jeff Goldblume
Substitute: John Doe
More...  Configure...

1056
External Interfaces

Warehouse: (Contact: Tom Becker)
Scales: (Contact: Fred Jackson)
Datev: (Contact: John Barnes)
More...  Configure...

1058
Collaboration Scenarios

CTI: ✓
Collaboration Rooms: ✗
Voice over IP: ✓
More...  Configure...

1060
System Monitoring

Monitoring Hours: Mo-So 00:00-24:00
Monitoring Level: Gold
More...  Configure...

1062
Active Services

Health Check: ✓ Last Run: 12-08-2005
Continous Improvement: ✓ Last Run: 07-08-2005
Sign of Life: ✓ Last Run: Today
More...  Configure...

1064
Your Business

Number of Active Scenarios: 10
Number of Active BP: 42
Current Projects: 1
More...  Configure...

[Print] [Close]

Incident Context Data UI ⎯1300

Context Data

| Context Data 1302 | | | | | | |
|---|---|---|---|---|---|---|
| | | | | | Options | Help |
| Provider Sanity | | Provider ID | | Context Description | Show Details in parallel | Hide Filter |
| | ⚡ | ABAP/SysInfo | | System Status | | |
| | ✕ | J2EE/Logfile | | Java Logfile | | |
| |◀◀ ◀ □ 0 ▶ ▶▶| | | | | |

1304  1306
Content | Provider Properties

| | Time | Category | Date | Provider ID / DSR Component | Message | Location |
|---|---|---|---|---|---|---|
| 🗐 | 9:47:50:507 | /System/Database/sql/buffer | 06/27/2005 | n/a | Buffer "P128090:PMO:SAPPMODB" with maximal 16777216 Bytes started (Settings: maxrecordsize = 2097152; maxlobsize = 1048576; displacement active = true; reloaddelay = 5) | com.sap.sql.sql.buffer.TBJBuffer |
| 🗐 | 9:22:26:794 | /System/Database/sql/buffer | 06/25/2005 | n/a | Buffer "P128090:PMO:SAPPMODB" was closed | com.sap.sql.sql.buffer.TBJBuffer |
| 🗐 | 17:11:24:973 | /System/Database/sql/buffer | 06/23/2005 | n/a | Buffer "P128090:PMO:SAPPMODB" with maximal 16777216 Bytes started (Settings: maxrecordsize = 2097152; maxlobsize = 1048576; displacement active = true; reloaddelay = 5) | com.sap.sql.sql.buffer.TBJBuffer |
| ⓘ | 17:07:03:429 | /System/Database/sql/jdbc/direct | 06/23/2005 | n/a | Connection object com.sap.sql.jdbc.direct.DirectPooledConnection @d480ea has already been closed | com.sap.sql.jdbc.direct.DirectPooledConnection |
| 🗐 | 17:07:03:038 | /System/Database/sql/buffer | 06/23/2005 | n/a | Buffer "P128090:PMO:SAPPMODB" was closed | com.sap.sql.sql.buffer.TBJBuffer |

[Close]

SERVICE AND APPLICATION MANAGEMENT IN INFORMATION TECHNOLOGY SYSTEMS

BACKGROUND

The subject matter described herein relates to service and application management in information technology (IT) systems.

IT systems, such as enterprise computing systems, may facilitate efficient planning and delivery of an company's products and services to consumers. Such systems may incorporate both hardware and software system and application components. For example, such systems may incorporate an extensive array of hardware components, such as application servers, data servers, networking equipment and client computer devices. The client computer devices may access and manipulate the data in application servers via a network, such as an intranet, extranet or Internet. Data and application servers may be centrally organized in one or more data centers, or the servers may be distributed across departments and sites of the organization.

An enterprise computing system may employ various software packages, such as an enterprise software component (e.g., enterprise resource planning (ERP) software), to manage data within the company. ERP software allows a company to efficiently process data that is used by multiple departments. As an example, a manufacturing company may employ an ERP system to manage its manufacturing, sales and financial departments. More particularly, an ERP system may provide resources for a sales department to track orders for products; resources for a purchasing department to track orders for parts needed to manufacture the ordered products; resources for a manufacturing department to track products through the manufacturing process and to manage inventory; resources for a sales department to track order fulfillment and generally manage interactions with customers; and resources for a financial department to track parts costs, pay suppliers, track orders and process payments for fulfilled orders.

Other software packages of an enterprise computing system may include various modules (or components) that may be used alone or integrated with other modules. For example, a company may employ a supply chain management (SCM) module to support the organization's manufacturing operations; an organization may employ a customer relations management (CRM) module to log interactions between, for example, a marketing department and a prospective customer or a support department and a current customer; and a company may employ a financials module to budget its operations, pay suppliers and employees, and receive payment from customers. Some companies may employ ERP software that integrates each of these modules into a single integrated system.

Most conventional ERP software and related modules (e.g., CRM, SCM, etc.) require considerable time, effort, knowledge and experience in order to implement, monitor and operate on a day-to-day basis, and upgrade to ensure a stable enterprise computing system. The activities required to manage the installation, the operation, the upgrade and the optimization of ERP software and related modules running on the enterprise computing system can be categorized as operations activities (e.g., the day-to-day monitoring of the ERP software and related modules for malfunction events, such as operational parameter changes [e.g., error messages, system failures, core dumps, etc.]), support activities (e.g., problem and malfunction support), change and deploy activities (e.g., installation of and updating the ERP software and related modules) and plan and optimize activities (e.g. improving long-term stability of the enterprise computing system operations or providing transparency about the deployed software resources).

IT departments, even large ones, often get lost in a maze of complex tools and thousands of pages of administration guides that are available to assist them in managing and performing these activities. Moreover, these IT departments, in particular their IT administrators, that use these software tools are still overwhelmed with various day-to-day reactive support tasks, such as manually monitoring, checking and clearing log files, manually performing patches and updates, manually executing backup and recovery procedures, user management, and managing and assisting end users, such as processing service requests and supporting end users having trouble with the customer's systems. Smaller IT departments, especially those that have limited resources and operating budgets, often cannot afford to acquire all the necessary software tools to assist them in managing and performing these activities. As such, these IT departments often spend a lot of their time on the day-to-day operations rather than on improving the operation of their company's enterprise computing system, which typically would decrease the time needed for day-to-day operations.

Additionally, sometimes IT departments cannot resolve particular service requests on their own and require the expertise of the ERP software manufacturer or service provider to resolve the service request. For example, a service request may involve an error in the ERP software that requires a software patch. Such service requests are typically processed pursuant to a service level agreement between the company (IT department) and the ERP software manufacturer and/or service provider. Often times, when such an error occurs, the IT department refers to their service level agreement to determine if it can even get support from the ERP software manufacturer and/or service provider to resolve the error. If, pursuant to the service level agreement, the ERP software manufacturer and/or service provider is required to provide support for such an error, the IT department usually calls or e-mails the technical support representative of the ERP software manufacturer and/or service provider and informs them of the error. Upon being notified, the ERP software manufactuer and/or service provider then refers to their copy of the service level agreement to confirm that they are required to provide support and then provides support as required by the service level agreement. However, because of the many manual steps involved in this process, the time it takes for the service request to be eventually resolved is not optimized.

Thus, there is a need for an IT services and application management solution that reduces the operational workload and optimizes the daily support process.

SUMMARY

The present inventors recognized the deficiencies of conventional software tools that are used to assist IT departments, for example, to install, operate, support, upgrade, and optimize their enterprise software (e.g., ERP software) and related modules along their software lifecycle. The present inventors also recognized that such conventional software tools are not integrated with enterprise software, which requires IT departments to purchase such software separately from their purchase of their enterprise software and to start and run such software tools separately from the enterprise software. The present inventors also recognized that such conventional software tools are difficult and inefficient to use, even for large IT departments, and do not adequately address the needs of financially sensitive, typically smaller, IT departments. The present inventors also recognized that IT departments that even use such conventional software tools still spend a substantial amount of time on reactive operational and support tasks. Consequently, the present inventors developed systems and techniques for managing software, such as enterprise software, installed on a client system, such as an enterprise computer system.

The disclosed systems and techniques reduce the operational workload and optimize the daily support process by integrating embedded services with the enterprise software installed on the client system and integrating the back-end system (e.g., an application provider system and/or a service provider system), e.g., by directly connecting the embedded services into back-end system infrastructure so that in-depth expertise of back-end providers can be directly provided to the client system in the form of detailed reports and analyses, and continuously (or regularly) exchange data between the client system and the back-end system(s) to keep the client system current and to ensure efficient enterprise software processes. The application provider is the provider (manufacturer) of the enterprise software. The service provider provides services for the enterprise software (e.g., user and system support, implementation service, etc.) The embedded services integrated with the enterprise software can include support services, operation services (e.g., a health check monitoring process), change and deploy services (e.g., a software maintenance service), and plan and optimize services (e.g., a continuous improvement service).

The health checks service can automate the monitoring of an event generation process on the client system and the creation of incidents and/or tasks based on the monitored events. During the creation of the incident and/or task, context or diagnostic data related to the generated event (e.g., the data that is needed to resolve the event, such as data related to an error message) can be automatically collected, stored and attached to the incident or task message that can be prepared and then pushed to appropriate personnel, such as the IT administrator, and displayed in a graphical user interface (UI), which can include control center views (summary pages) and work center views (detailed pages). Thus, the health checks service can automatically inform people in charge of handling an incidents and tasks (e.g., at IT administrator) and can provide the context data to resolve the incident or task. Additionally, a notification of the creation of the incident or task can be sent to the backend system(s) and mission critical incidents can be directly routed to the back-end system for resolution according to service level agreements entered into between the company (customer) and the back-end provider (e.g., the application provider (e.g. SAP) and/or service provider (e.g., a Partner)).

The support service and software maintenance service can include a service request management process module embedded in the client system and directly integrated with the back-end system(s). This architecture can provide a built-in direct channel for user initiated incidents and system initiated incidents to the back-end system(s) for those client systems having a service level agreement, software maintenance capabilities, and pushing of regular content updates from back-end providers for all embedded services.

The software maintenance service also can be used to automate a monitoring and/or a data collection service residing at the client IT system to automatically collect and exchange client information needed to maintain the client IT system. More particularly, client information may be collected from various sources within the client IT system, aggregated, formatted into a standard format, and transmitted to the back-end system(s). In response to the transmitted information, follow-up information may be received from the back-end system(s). The follow-up information may include, for example, software updates to various components of the client IT system or new features for implementation in the client IT system. As an example, the client system information can be used to update a back-end maintained repository of client system information associated with software installed on the client IT system. The maintained database can be used to determine one or more software update recommendations that are sent to the client IT system. In response to a trigger event (e.g., a user request at the client IT system), one or more software updates associated with the update recommendations can be automatically downloaded and deployed at the client IT system.

The continuous improvement service can periodically and regularly analyze the client system (e.g., process monitoring and safeguarding), identify the best use of client system resources based on a predefined benchmark, and provide detailed recommended solutions (e.g., courses of action) to improve system efficiency to the client system, which can be implemented manually or automatically. The results of the recommended actions can then be displayed or provided to a person in charge, such as the IT administrator.

The output of one or more of these embedded services can be pushed to one or more views (web pages) in a control center UI, such as a My Home view and a Work Inbox view. These views can provide an overview of the work items a user is responsible for. Thus, in some implementations, problems, incidents, tasks, recommendations, proposed solutions, etc. can be automatically pushed to the user, such as the IT administrator or key user, and for problems, incidents and tasks, the context data needed to fix the problem, resolve the incident or perform the task can be attached and displayed in one inbox (i.e., an inbox on the control center UI). Also, the control center UI can be the starting point for non-regular, exception-based tasks. Furthermore, the control center UI can include additional views that provide a summary or an overview of other types of data. For example, additional views can include a News view for displaying company news information and a Self-Service view for displaying information and links to activities that the user can perform himself or herself. The control center UI also can display links to various work center views that are assigned to the user. Work center views are the lowest granularity of the roles assigned to a user, i.e., there usually is one work center view for each job description. The work center views can provide the specific work items a user has to work on a regular basis in a work list. Each work item in the work list can be propagated or escalated to a universal work list (UWL) displayed in the My Home view and/or Work Inbox view in the control center UI based on criteria according to, for example, a service level agreement. Additionally, the work items displayed in the UWL can be provided with an alert (e.g., initial response time, mean reaction time, severity, priority, etc.) to inform the user of critical information about the work item. Input to the control center UI can come from various sources/services, such as first level support (e.g., proposed solutions and/or context information from problems requiring the IT administrator's attention); alerts generated from system monitoring processes that require action; tasks from an integrated (embedded) electronic operation handbook and tasks and/or updates from the back-end system(s). For IT administrators, all tasks requiring his or her attention can be pushed to the control center UI. Moreover, for IT administrators, the control center UI may contain a system overview view, which lists relevant system status information, such as the information contained in conventional, paper-based operation handbooks. As a result, the IT administrator can see the system status inclusive trends in a single view.

Additionally (for any user), a fact sheet may be associated with a view of the control center UI (such as the My Home view or others), which can be accessed through a link located in the view. The fact sheet contains on one page all the information that is needed to clearly show who is responsible for handling IT problems, incidents, tasks, service requests, etc. The information can include, for example, contract information (e.g., type of service level agreement and related info and contact information of point of contact), service status information, client IT contacts, back-end provider IT contacts, etc.

In one aspect of managing software installed on a client system, two or more embedded services integrated with the software installed on the client system are initiated. The embedded services may include a health check monitoring service to automatically trigger one of a system incident message and an administrative task message in response to a generated event, a support service to handle at least one of a system incident message and a user incident message, a software maintenance service to automatically deploy of one or more software updates to the software installed on the client system, and a continuous improvement service to implement one or more recommended actions to improve an efficiency of the client system. The information outputted from the initiated embedded services is then aggregated and displayed in a graphical user interface.

In one implementation of the health check monitoring service, one or more generated events are selectively received. Each generated event may indicate a change in an operational parameter of components of the system and is received if the event triggers one or more predetermined logical rules. Thereafter, for each received event, it is determined whether the received event has an associated predefined task. Then, a generation of an incident for each received event not having an associated predefined task is initiated. The components of the system can include application software modules such as a customer relation management module, a supplier relation management module, a financial management module, a supply chain management module, a human capital management module and a project management module. In some implementations, a generation of an administrative task for each received event having an associated predefined task is initiated.

In one variation of determining whether the received event has an associated predefined task, a number of predefined events are received. Each predefined event is associated with one or more predefined tasks that are needed to resolve the associated predefined event. Thereafter, it is determined, for each received event, whether the received event is a predefined event. Then for each received event, the one or more predefined tasks are associated with the received event that is a predefined event.

In one variation of initiating a generation of an incident for each received event not having an associated predefined task, context data associated with each received event are automatically collected. Then, for each received event, an incident report is generated based on the collected context data. Thereafter, for each incident report, an incident service request is generated based on the generated incident report is generated. In some implementations, the collected context data are stored and the generated incident service request is associated with the stored context data. In some implementations, the generated incident service request is displayed in one or more views of a graphical user interface.

In one implementation of the support service, an incident message generated by either the client system or an end user is received. The incident message may include collected context data (e.g., diagnostic data) characterizing a state of the client system. The incident message is assigned to an appropriate processor (e.g., a key user, an IT administrator, etc.) based on the collected context data. The incident message is then routed to the appropriate processor. Then, an implementation of a solution to the incident message is initiated by the appropriate processor. In some implementations, a solution message can be routed to an end user to notify the end user of a solution to the incident message generated by the end user.

In one implementation of the software maintenance service, information describing a change to the software installed on the client system is transmitted to a back-end system (e.g., the application provider and/or service provider). Thereafter, one or more update recommendations are received from the back-end system based on the transmitted information. Next, one or more software updates associated with the update recommendations are automatically downloaded in response to a trigger event. Then, the software updates are automatically deployed. In some implementations, the client system is automatically prepared for deploying the downloaded software updates, which can include automatically checking for prerequisite tasks, providing notification of the prerequisite tasks, and providing instructions for manually performing the prerequisite tasks.

In one implementation of the continuous improvement service, information describing the client system is transmitted to the back-end system. Thereafter, one or more recommended actions to improve the efficiency of the client system are received from the back-end system based on an analysis of the transmitted information. Then, one or more of the received recommended actions are implemented.

In one variation displaying the aggregated information in a graphical user interface, the aggregated information may be displayed in a work list associated with a user based on a service level agreement.

Computer program products, which may be embodied on computer readable-material, are also described. Such computer program products may include executable instructions that cause a computer system to conduct one or more of the method acts described herein. Similarly, computer systems are also described that may include a processor and a memory coupled to the processor. The memory may encode one or more programs that cause the processor to perform one or more of the method acts described herein.

The subject matter described herein may provide one or more of the following advantages: Daily support processes can be optimized; functionality, assistance and productivity can be improved; and training or manual effort required to implement, operate and maintain client IT system, such as an enterprise computing system, can be reduced. These advantages contribute to reducing the investment in information technology skill sets that are often required and the number of employees needed for system and application operations. Furthermore, the subject matter described herein can reduce the manual monitoring efforts often expended by an IT administrator and can improve system stability and reliability. Thus, the total cost of ownership (TCO) to a company implementing the systems and techniques described herein can be reduced.

The details of one or more implementations are set forth in the accompanying drawings and the description below. Other features and advantages will be apparent from the description and drawings, and from the claims.

DESCRIPTION OF DRAWINGS

FIG. 8A-F are various views of a control center UI suitable for use with the system and application management techniques.

FIG. 10 illustrates a fact sheet.

FIG. 12 is a view of an incident instance user interface for use by an IT administrator.

FIG. 13 is a view of an incident context data user interface suitable for use with the system and application management techniques.

Like reference symbols in the various drawings indicate like elements.

DETAILED DESCRIPTION

System Overview

Figure 1:
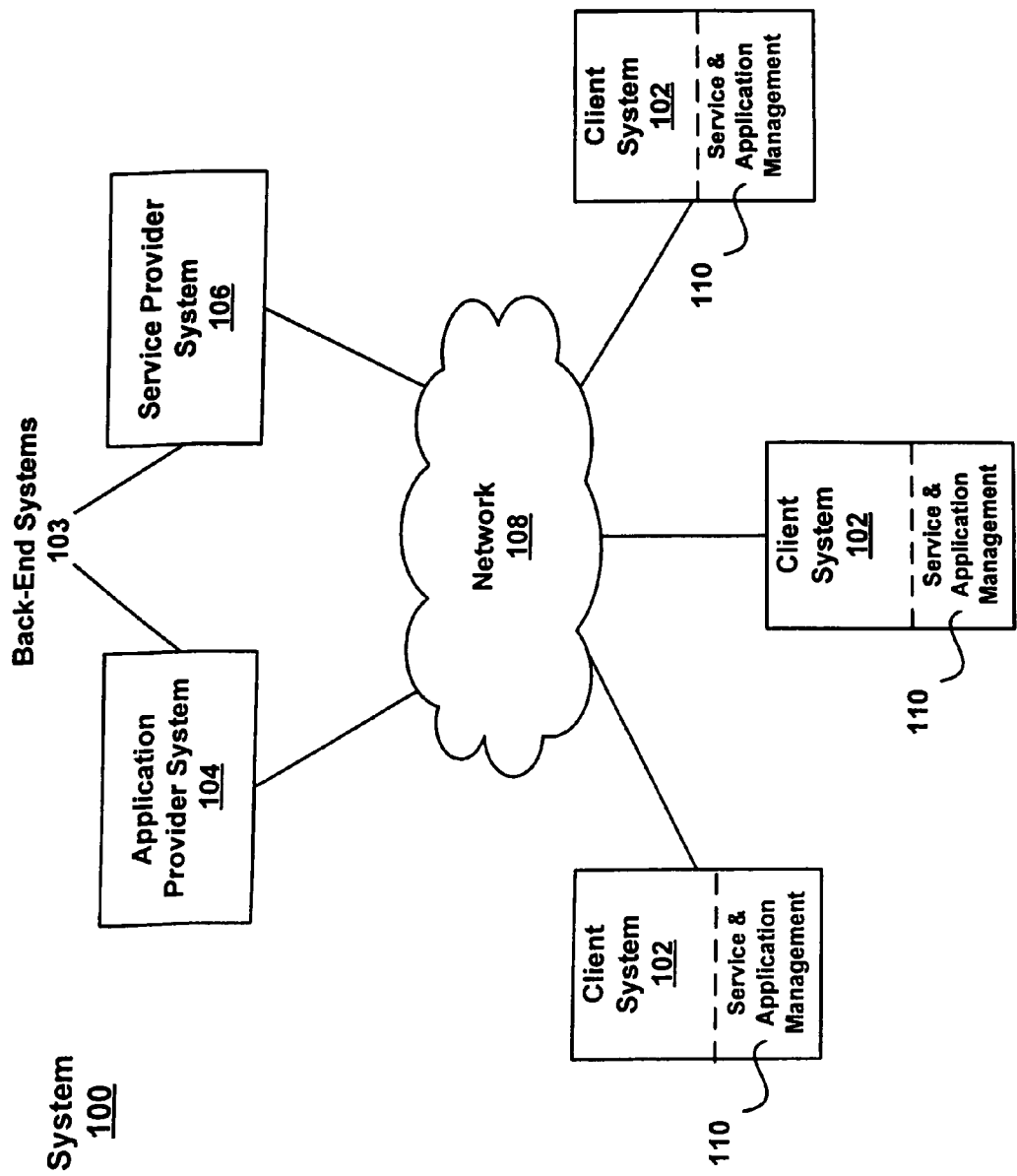
FIG. 1 is a schematic diagram of a system that can utilize a service and application management techniques described herein.

FIG. 1 is a schematic diagram of a system 100 that can utilize a service and application management technique described herein. The system 100 includes one or more client systems 102 and one or more back-end systems 103, for example, an application provider system 104 and a service provider system 106, which are operatively coupled to a network 108, such as the Internet, an intranet, a local area network, an Ethernet, a wireless network, and/or a telephone network. The client systems 102 can be any systems that run software. The software can be a single application or an operating system, or a collection of software applications or software components that perform various tasks in a larger system or application, such as enterprise software (e.g., ERP software) and/or a business application suite, such as customer relation management (CRM), business administration, financial, and manufacturing software. A service and application management module 110 that implements the techniques described herein can be embedded in the client systems 102.

Generally, in system 100, the module 110 embedded in client system 102 can be used to manage services and applications of the client system 102, such as embedded operations services (which can include services related to day-to-day operations for maintaining a stable enterprise computing system, e.g., a health check monitoring process), embedded support services (which can include processes related to problem and malfunction support), embedded change and deploy services (which can include processes related to the installation and/or updating of software and related modules, e.g., a software maintenance process), and embedded plan and optimize services (which can include processes related to improving long-term stability of the client system 102 operations or providing transparency about the client system 102 resources, e.g., a continuous improvement service).

The service and application management module is described more fully with reference to FIGS. 2-13.

It should be apparent that the system 100 is exemplary and other configurations, arrangements and network topologies for system 100 are possible, including more or fewer clients 102 and/or multiple systems 104, 106. In some variations, the application provider system 104 and/or the service provider system 106 are/is integrated with the client systems 102 through the network 108, which can be configured to facilitate continuous or periodic data exchange between the systems 104, 106 and the client systems 102 using known networking protocols, such as TCP/IP and HTTP. In some variations, an application provider system 104 need not be used in system 100. Likewise, a service provider system 106 need not be used in alternative variations of system 100.

From time to time, system configuration information associated with the client systems 102 is transmitted to the application provider system 104 and/or the service provider system 106. In some implementations, the application provider system 104 and/or the service provider system 106 requests system configuration information from the clients 102 on a scheduled basis using, for example, a polling scheme. In other implementations, the client systems 102 send information to the application provider system 104 and/or the service provider system 106 continuously or periodically, or in response to one or more events, for example notification of an incident or administration task.

Service and Application Management Module—Architecture

Figure 2:
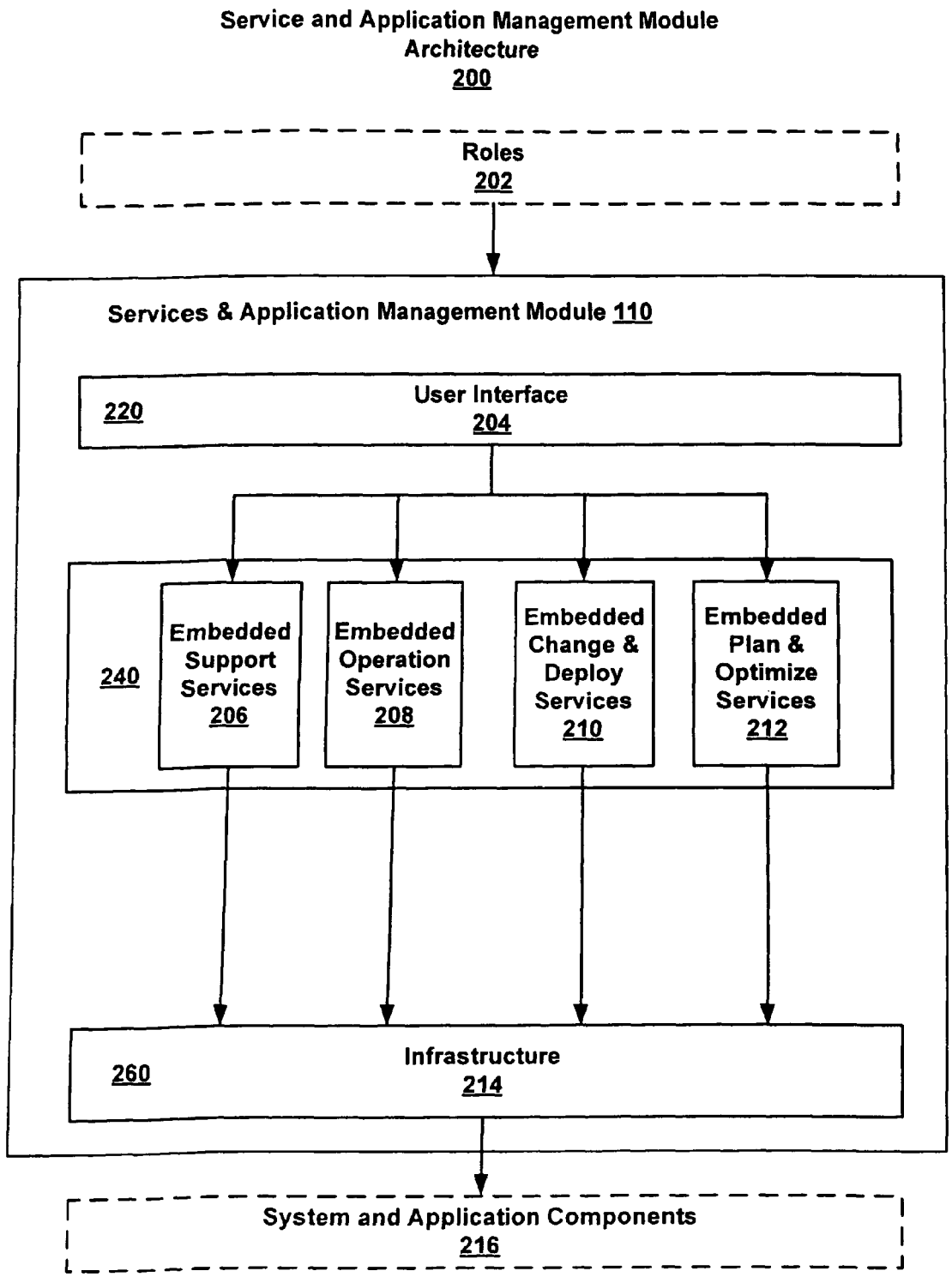
FIG. 2 is a schematic diagram of a service and application management module architecture.

FIG. 2 is a schematic diagram of a service and application management module architecture 200. The architecture 200 includes one or more software layers, each including one or more software components for performing various tasks. In some implementations, the software layers include a user interface layer 220, an embedded services layer 240, and an infrastructure layer 260.

The role 202 assigned to user of the client system 102 can be used to tailor a user interface (UI) 204 of the user interface layer 2202 presented to that user and the input provided to the UI 204 from one or more embedded services 206, 208, 210, 212 of the embedded services layer 240. The user can be assigned one or more roles 202, such as a key user, an IT administrator, an end user, a business manager, an IT manager, and/or a back-end support staff. In some implementations, some users can have multiple roles 202, such as being both a key user and an IT administrator or other combinations of roles 202.

A key user is usually an employee within a department at the company that installs the client system 102 who is responsible for the operation and support of a specification application (e.g., first level support for end users for application specific errors). The key user also may be involved in the implementation of software, contributing his or her knowledge of the company's own underlying business processes when it comes to customizing the client system 102. The key user also may be involved in handling monitoring and more detailed analysis of incidents.

An IT administrator is usually an employee at the company who is responsible for day-to-day operation of the client system 102, and in particular the various software packages employed on client system 102, such as enterprise software (e.g., ERP software). The IT administrator also may be the main point of contact to back-end providers, such as service providers (e.g., partners) and/or the application provider (e.g., SAP), when it comes to analyzing and solving incidents or problems. In addition to the IT administrator, a network administrator is an employee who usually assumes responsibility for all hardware infrastructure-relevant tasks, such as maintaining the networks, printers, and server hardware. Of course, the same employee can assume both roles (i.e., IT administrator and network administrator).

An end user is usually an employee at the company who performs his or her day-to-day work in a department, e.g., accounting, payroll, marketing, human resources, etc. End users may include buyers, sales staff, accounting staff and any other employee who uses the client system 102.

The business manager is often the owner of a business process that is supported by the client system 102, and for which he or she bears staff and organizational responsibility. The business manager can be the sales director, purchasing director, CFO, etc.

The IT manager is the generally the individual at a company who bears staff and organizational responsibility for IT operations. The IT manager tends to be responsible for IT related tasks, such as negotiating service legal agreements (SLA) with business managers and service partners, ensuring compliance with SLAs, ensuring availability of a service or help desk, which handles inflow and outflow of reported incidents or errors, and defining the IT strategy and hardware infrastructure planning.

The user interface layer 220 includes various software components for generating a user interface 204 and presenting the user interface 204 to a user of the client system 102, including the output of one or more embedded services 206, 208, 210, 212. The user interface 204 can include multiple hierarchically structured views. For example, after logon by a user, a start up view of a control center UI may be presented. In some implementations, the start up view can be the central company entry and control point of every user. The start up view can have links to other views that are associated with the user's predefined roles 202, which may be referred to as work center views, where detailed information relating to the user's roles 202 can be found. The start up view also can have one or more monitors that aggregate information of linked work center views or of other views, such as a work list view, a calendar view, a reports view, a documents view, a news view, a my home view, a sitemap view and a self-services view. Various examples of views that can comprise the user interface 204 are described in FIGS. 7-11.

A key user can have a simple UI 204 that receives those embedded services that are absolutely necessary (e.g., in some implementations embedded support 208) because the key user role is not the employee's main responsibility, but instead just a small part of his or her day-to-day work. A number of wizards of the infrastructure 214 can assist the key user with tasks performed less frequently, and teach the key user the required skills on the job. The tasks a key user usually needs to perform can be integrated directly in his UI 204. A universal work list (UWL) monitor can be provided in a view of the key user's UI 204 to display the pending tasks sorted by type. The required analysis tools, monitors, and transactions can be linked directly with corresponding tasks, and wizards can guide the key user through their execution. As such, training of the key user can be reduced.

The IT administrator can have a UI 204 that receives as input one or more of the embedded services 206, 208, 210, 212 tailored to his or her needs. For example, various work center views can be provided as part of UI 204 that supply all the tasks that is required for his or her day-to-day work. In addition, a universal work list (UWL) can be provided in a view of the IT administrator's UI 204 to enable the IT administrator to organize and delegate his or her work. The UWL can collect some or all system notifications, warnings of exception situations, pending tasks, and information from the back-end systems 103 (e.g., update notifications, additional information for services, etc.). Additionally, links can be provided to wizards of the software infrastructure layer 260, which can be used by the IT administrator to support his or her daily work.

An end-user can have a simple UI 204 from which he or she can contact an appropriate processor in case of an application error (e.g., the key user, the IT administrator or back-end support staff). In some implementations, the end user can be provided a wizard-driven application in the UI 204 that enables him or her to collect the context data (e.g., all the relevant information) associated with the error and forward it to the appropriate processor for resolution. In other implementations, the end user's manual interaction can be kept to a minimum by keeping the necessary input to a minimum, e.g., by providing a button on or more views of the UI 204 (e.g., a Self Services view of a control center UI) that can be clicked with the end user's mouse cursor to initiate a service request and resolution process. In addition, a universal work list (UWL) can be provided in a view of the end user's UI 204 to display information related to the status of the service request processing so that the end user is kept informed.

The business manager can have a UI 204 similar to an end user's UI 204.

The IT manager's UI may include views that include, e.g., detailed reports regarding compliance with SLAs, monitors that provide early warnings of potential problems, which can help the IT manager with strategic decisions involving SLA compliance, and reports related to budgeting and accounting to enable and simplify recording of the incurred costs and their further charging within the company.

Typically, the user interface 204 is presented as a web page which is served by a web server at the client system 102, which can be viewed through a browser (e.g., Microsoft Internet Explorer®). In some implementations, the user interface 204 is presented as a web page which is served by a web server at the one of back-end systems 103, which can then be viewed through a browser. In other implementations, an application or service running on the client system 102 generates the user interface 204 using information generated within the client system 102 and/or the back-end system(s) 103, which can be accessed through an application program interface (API) or other hook into the back-end system(s) 103 (e.g., a web portal).

The embedded services layer 240 contains various services components, such as an embedded support services component 206, an embedded operation services component 208, an embedded change and deploy services component 210, and an embedded plan and optimize services component 212. The output of one or more of these services components or one or more services within these components may be used as input to the UI 204 of a user based on his or her assigned roles 202.

The embedded operation services component 208 provides services relating to operational activities that are persistently required to ensure the operation of application and system components. These services can be planned (or scheduled), ether date or time triggered (such as back-up or restore procedures) or quantity-dependent (e.g., user administration effort dependent on the number of users). The embedded operation services component 208 automates most system administration tasks. Those administration tasks requiring manual intervention are routed to the IT administrator or other qualified individual for appropriate action. In some implementations, using the embedded support process, i.e., incident processing and management process (described in more detail below), a notification of the creation of the incident or task to the backend system(s) 103 can be generated and/or mission critical incidents can be directly routed to the back-end system for resolution according to service level agreements entered into between the company (customer) and the back-end providers (e.g., the application provider (e.g. SAP) and/or service provider (e.g., a Partner)).

The embedded operation services component 208 can include a health check monitoring process, which automatically monitors system and application components of the client system 102 for generated events and creates incident and/or administration tasks based on the generated event. During the creation of the incident and/or administration task, context or diagnostic data related to the generated event (e.g., the data that is needed to resolve the event, such as data related to an error message) can be automatically collected, stored and attached to the incident or task message that can be prepared and then pushed to appropriate personnel, such as the IT administrator, and displayed in a graphical user interface (UI). Additionally, a support service (described below) can provide a notification of the creation of the incident or task to the backend system(s) and can directly route mission critical incidents to the back-end system for resolution according to service level agreements entered into between the company (customer) and the back-end providers (e.g., the application provider (e.g. SAP) and/or service provider (e.g., a Partner)).

The embedded operations services can also include an integrated electronic operations handbook, which can include a list of predefined tasks and the actions that are necessary for handling each predefined task, such as when the task has to be performed (event based or time based), the responsible person (role), documentation on the task, and information on the service level agreement. In some implementations, a guided activity transaction, e.g., a wizard, may be provided to help a user perform an administration task, which guides the user through a defined activity. In some implementations, the integrated electronic operations handbook can be used by the health check monitoring service to determine whether a generated event should be classified as an administration task or an incident. Additionally, in some implementations, a notification of the creation of the incident or task to the backend system(s) 103 and can directly route mission critical incidents to the back-end system for resolution according to service level agreements entered into between the company (customer) and the back-end providers (e.g., the application provider (e.g. SAP) and/or service provider (e.g., a Partner)). Details of the health check monitoring process of the operations services component 208 are described with reference to FIGS. 3 and 4, and in co-pending application Ser. No. 11/322,890 filed on even date herewith and entitled "Health Check Monitoring Process" and having, which is incorporated in full by reference.

The embedded support services component 206 can provide processes relating to operational activities that involve service requests concerning problems and malfunctions. These services can be triggered by exception situations (i.e., system generated) or directly by users and, therefore, are not planned. The embedded support services component 206 can be used by end users experiencing a problem or malfunction in a particular business application and by IT administrators (or key users) during incident and problem management. The objective of incident management is typically to restore a malfunctioning IT service as quickly as possible, which can involve workarounds that do not eliminate the true cause of the malfunction. Incidents also include service requests that do not involve malfunctions, but simply request specific services, such as password reset. The objective of problem management is typically to permanently reduce the number and impact of incidents by tracking down the causes of malfunctions, providing workarounds, and initiating the changes needed to correct the errors. Both incident management and problem management can be provided by the embedded support services component 206.

The embedded support services component 206 can include an incident (or service request) processing and management process. In addition to system generated incidents, this process can provide end user support and automated context collection for resolving incidents created by an end user. Moreover, the incident processing and management service can be integrated with the back-end systems 103 to receive notifications of the creation of an incident and/or an administration task for monitoring and/or handling the resolution process. Details of the incident processing and management process are described with reference to FIG. 5, and in co-pending application Ser. No. 11/322,623 filed on even date herewith and entitled "Enterprise Software With Contextual Support" and having, and co-pending application Ser. No. 11/322,799 filed on even date herewith and entitled "Contextual Enterprise Software Support Tools" and having, both of which are incorporated in full by reference.

The embedded change and deploy services component 210 relates to operational activities that occur either once during system installation (deploy) or intermittently, e.g., whenever changes are made to the system and application components of the client system 102 (change), including software upgrades. These services can be user or system initiated. For example, the triggering or initiation of these services can be based on requirements from a user's department (e.g., new business processes or legal changes), internal IT optimization efforts, and changes to resolve errors, which can be initiated by the back-end system(s) 103 (e.g., shipping new support packages or versions of application software) or from within the problem management process (support services component 206).

In some implementations, the embedded change and deploy services can include a software maintenance management process, which can provide one-click update installation triggered by, e.g., the health check monitoring service or other data collection/monitoring services to automatically collect and exchange client information needed to maintain the client system 102, and also can provide proactive notification of updates available for download. More particularly, client information may be collected from various sources within the client system 102, aggregated, formatted into a standard format, and transmitted to the back-end system(s) 103. In response to the transmitted information, follow-up information may be received from the back-end system(s) 103. The follow-up information may include, for example, software updates to various components of the client system 102 or new features for implementation in the client IT system. As an example, the client system information can be used to update a back-end system 103 maintained repository of client system information associated with software installed on the client system 102. The maintained database can be used to determine one or more software update recommendations that are sent to the client system 102. In response to a trigger event (e.g., a user request at the client system 102), one or more software updates associated with the update recommendations can be automatically downloaded and deployed at the client system 102. The embedded change and deploy services can also include a safeguard service, which can periodically monitor status of installation and use of software or a software suite and provide software upgrade recommendations to ensure software implementation is correct before going live. Details of the software maintenance process are described with reference to FIG. 6, and in co-pending application Ser. No. 11/324,731 filed on even date herewith and entitled "Software Maintenance Management" and having, which is incorporated in full by reference.

In some implementations, both the embedded support services and embedded software maintenance process can include a service request management process module embedded in the client system 102 and directly integrated with the back-end system(s) 103. This architecture can provide a built-in direct channel for service requests (user initiated) and incidents (system initiated) to the back-end system (s) 103 for those client systems 102 having a service level agreement, software maintenance capabilities, and pushing of regular content updates from the back-end system(s) 103 for all embedded services.

The embedded plan and optimize services component 212 can include tactical and strategic IT and system and application management activities that enable the long-term stability of system operation, make the deployed resources transparent and enable their optimization. For example, in some implementations, the embedded plan and optimize services component 212 optimize services component 212 can include a continuous improvement process that can periodically and regularly analyze the client system 102 (e.g., process monitoring and safeguarding), identify the best use of client system 102 resources based on a predefined benchmark, and provide detailed recommended solutions (e.g., courses of action) to improve system efficiency to the client system 102, which can be implemented manually or automatically. The results of the recommended actions can then be displayed or provided to a person in charge of the client system 102, such as the IT administrator. Details of the continuous improvement process are described with reference to FIG. 7, and in co-pending application Ser. No. 11/323,664 filed on even date herewith and entitled "Deploying Software Based on a Calculated Deployment Risk Level" and having, and in co-pending application Ser. No. 11/323,667 filed on even date herewith and entitled "Exchanging Data Between Enterprise Computing Systems and Service Provider Systems" and having, both of which are incorporated in full by reference.

The infrastructure layer 260 includes infrastructure components 214, which support the embedded services 206, 208, 210 and 212. The infrastructure components 214 can include, e.g., a wizards component; a monitor, report and alerts component; an organizational management component; a service delivery component; a connectivity component (e.g., connecting the client systems 102 to the back-end system(s) 103); a configuration database interface component; a solution database component; a universal work list (UWL) component, and expert tools interface component; a business process management (BPM) interface component; and a knowledge management interface component. The services and application management architecture 200 is coupled to the system and application components 216 for monitoring and/or data collection activities.

It should be apparent that the architecture 200 is exemplary, and other architectures can be used that have more or fewer components or layers. The various components of the architecture 200 can be located at the client system 102 and/or the back-end system(s) 103. In some implementations, the architecture 200 is implemented by a single program or application or by one or more components of an operating system on the client system 102.

Health Check Monitoring Process

Figure 3:
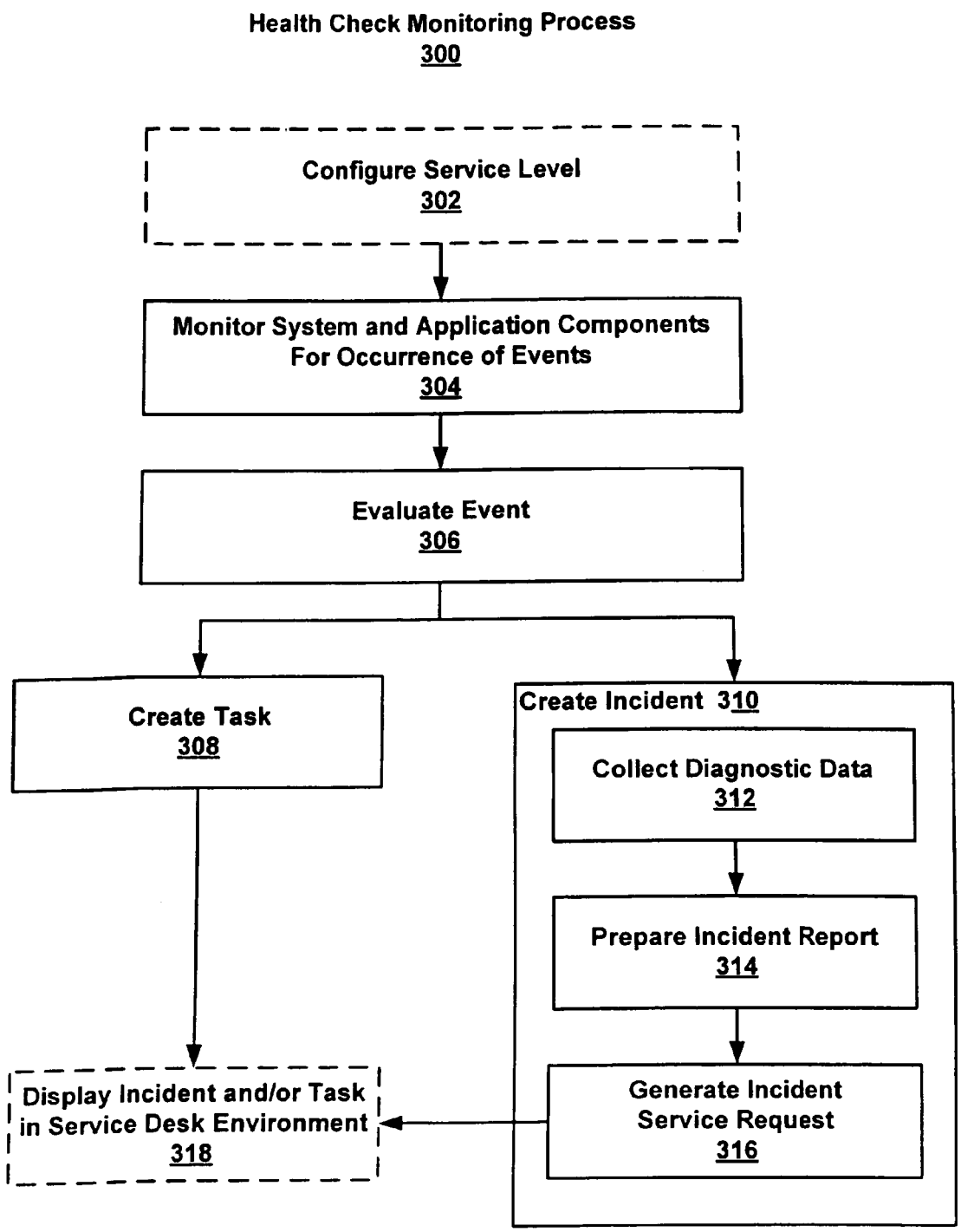
FIG. 3 is a process flow diagram of a health check monitoring service process of an embedded operations services module.

FIG. 3 is a process flow diagram of a health check monitoring process 300 of the embedded operations services module 208. Generally, the process 300 either continually or periodically monitors system and application components residing in the client system 102 and creates incident and/or administration tasks if a critical situation is detected. During the creation of the incident and/or administration task, context or diagnostic data related to the critical situation (e.g., the data that is needed to resolve a critical generated event, such as data related to an error message) can be automatically collected, stored and attached to the incident message (report) or task message (report) that can be prepared and then pushed to a service desk environment and appropriate personnel, such as the IT administrator, and displayed in a graphical user interface (UI).

At 302, an operator of a client system (e.g., an IT administrator) configures the service level for client system 102 using, for example, a service level configuration user interface. The IT administrator may define the schedule that the process 300 is performed, e.g., constantly or periodically, such as every hour or daily. Step 302 is performed during configuration time, i.e., once the IT administrator configures the service level, he or she does not have to reconfigure the service level to initiate process 300 unless the operator desires to change the schedule or other service level information. Thus, during run-time of process 300, step 302 is typically not performed as the operator has already set the service level during design time.

In some implementations, the process 300 begins in accordance with the pre-defined schedule, e.g., hourly or daily, set by the operator of a client system (e.g., an IT administrator) during service level configuration 302. In other implementations, the process 300 begins when initiated by the operator. Once the process 300 is initiated, at 304, the system and application components of the client system 102, whether decentralized or local, are monitored for the occurrence of any events. An event, for example, is a change in system or application status or a system or an application performance value exceeding a threshold. Monitored events are stored and pushed to an evaluation engine, such as an event classification engine of a health check monitor, where, at 306, the pushed events are evaluated. In some implementations, process 300, when initiated may start at 306, as 302 can occur separately from process 300. In these implementations, it may be desired to monitor the system and application components of the client system 102 constantly and not require the execution of the monitoring to be tied to the initiation schedule of process 300.

The evaluation of events, at 306, may include two processes. In the first process, each event can be routed based on rule logic (e.g., AND, OR, NOT AND, etc.), which, e.g., may be retrieved from a rules catalog of an integrated electronic operations hand book, which also includes other data storages, such as a task catalog and configuration data. The rules logic may include scenarios, such as "if A AND B then C," or "if A AND B, then NOT C." The rules-based classification and routing can include time dependent rules logic, such as "if A happens more than B times in C seconds, then D" or "if A happens AND NOT B happens within the next C seconds, then D." The rules logic can also include logic that classifies and routes an event based on severity and system impact, such as for an evaluation of a single event regarding its attributes in point in time. Moreover, the rules logic can include logic that classifies and routes events based on an evaluation of a single event according to the frequency of its occurrence. For example, some events can be meaningless if they occur only once, but can indicate a severe issue if they happen more frequently, such as a performance event that occurs more often over time. The rules logic further can include logic that classifies and routes different events occurring at the same time, which may be useful to identify the actual system status. For example, if a certain server does not respond and the corresponding network link indicates a network failure, then the actual problem is more likely a network issue rather than a service problem. This information can be used in order to trigger an appropriate system analysis. The rules logic also can include logic that classifies and routes multiple events occurring over a period of time.

As an example of an event being classified and routed based on rule logic, assume a database response time exceeds a certain threshold, which causes the generation of an event. But say, e.g., the event occurs only during the night while a time-consuming batch job is running. As a result, the rules-based classification and routing process may determine that the event need not be routed for further processing, e.g., by the second process of the evaluation 306). As another example, assume the database time exceeds a certain threshold several times, and the response time values increase over time during productive working hours. As a result, the rules-based classification and routing process may determine that the event needs to be routed for further processing, e.g., by the second process of the evaluation 306. Typically, these routed events are critical system events from the application components.

In some implementations the rules catalog (data storage) can be maintained by the client system 102, the application service provider system 104, and/or the service provider system 106. The first process is designed to handle the processing of a high throughput of events in a short time frame. As a consequence, the analysis at his level is not as detailed as may be required for the eventual resolution of a routed event. As a result, the second process is provided, which can provide more detailed analysis of each rule-based routed event. In some implementations, the first process can occur locally in each client system 102, while the second process can occur on a central client system 102.

With respect to the second process of 306, each rule-based routed event triggers the execution of the second process of 306. The second process of 306 retrieves the routed event input (e.g., response time values, file system usage, CPU usage, etc.) and determines whether the routed event should be classified as an incident or an administration task. In some implementations, additional information about the routed event may be desired and can be retrieved from the system and application components associated with the event in order to determine whether the routed event should be classified as an incident or an administration task. Based on the retrieve information, the tasks which are necessary to analyze and resolve the event are selected from, e.g., a task catalog (data storage) of a integrated electronic operations handbook, and processed to determine whether to classify the routed event as an incident or an administration task. If the tasks necessary to analyze the event are located, the event is classified as an administration task; otherwise the event is classified as an incident.

In other words, classifying the generated event as either an incident or an administration task can be based on predefined criteria, as provided by the task catalog of the integrated operations handbook. The task storage includes predefined task events and can also include other information, such as task schedules, task responsibilities, and service level agreement data. In some implementations, the task storage defines the responsible person for processing the task event. Thus, in some implementations, evaluating whether a routed event should be classified as an incident or task can be accomplished by searching the task storage of the operations handbook to determine if the routed event is listed in the operations handbook. If the generated event is not listed, then the generated event can be classified as an incident. If the generated event is listed, then the generated event can be classified as an administration task.

If, at 306, the generated event is evaluated and determined to correspond to an administrative task (e.g., a configuration parameter needs to be changed according to a predefined schedule), then at 308, an administration task is created and associated context data is provided with the administration task. Optionally, an administration task can be time-based triggered, e.g., periodic administration task or a combination of time-based triggered and event-based triggered (step 308). Next, at 318, the created administration task may be optionally displayed in a service desk environment, e.g., in a view of the UI 204 for use during task management.

If, at 306, the generated event is evaluated and determined to correspond to an incident, at 310, an incident is created, and, at 318, may be optionally displayed in a service desk environment. Within the step of creating an incident 310, the context (or diagnostic) data associated with the incident is automatically collected. The context or diagnostic data may include, e.g., technical and application information, that is usually required to resolve the incident. The context data can include, e.g., relevant system and application information from all architectural layers, such as a user interface layer, enterprise service layer, a business object layer and a system layer. Because the context data is automatically collected, at or near the time the event, which caused the creation of the incident, occurred, the state of the system or application components causing the incident is preserved (unlike conventional systems in which an operator may attempt to resolve the incident after the associated log files or other system or application component context information may have already been deleted).

Next, at 314, an incident report is generated, which provides an explanation of the why the incident was triggered with the collected context data. Thereafter, at 316, an incident service request is generated, typically by a service desk, such as a Customer Relationship Management (CRM) system residing on an application platform within the client system 102. In such implementations, the service desk receives the incident report, stores the report, and generates the service request. The incident service request may then be optionally displayed service request environment, such as in the user interface 204 so that the IT administrator (or key user) can be visually notified of the incident service request and track the status of the incident service request.

Health Check Monitoring Process
Architecture—Run Time

Figure 4:
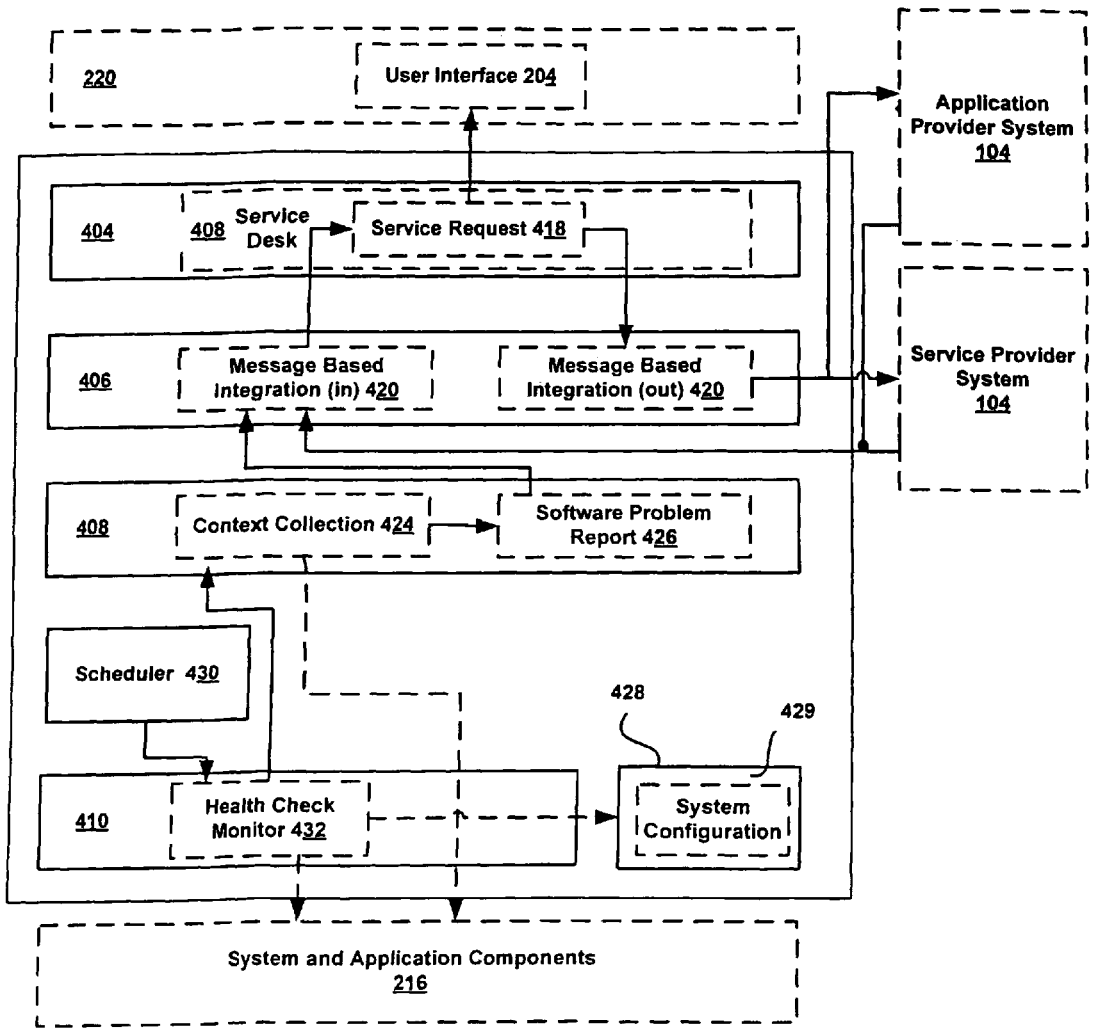
FIG. 4 is a schematic diagram of a health check monitoring process architecture illustrating run time system incident creation and notification.

FIG. 4 is a schematic diagram of a health check monitoring process architecture 400 illustrating run time incident creation and notification. The architecture 400 includes one or more software layers, each including one or more software components for performing various task associated with the health check monitoring process 300. In some implementations, the software layers include an application platform layer 404, a process integration layer 406, a data packaging layer 408, a scheduler 430, services delivery layer 410, and services landscape layer 428.

The architecture 400 will be explained in context with a run-time creation of an incident. After an operator, such as an IT administrator, configures the service level for the health check monitoring process as described in FIG. 3, the scheduler 430 dictates when the health check monitoring process is activated, unless overridden by an operator or user-initiated execution of the health check monitoring process. If the scheduler 430 has been configured to run the health check monitoring process every minute, for example, then at the designated time, the scheduler 430 causes the health check monitor 432 in the services delivery layer 410 to retrieve the system configuration 429 from the services landscape layer 428. Alternatively, the system configuration 429 may be pushed to the health check monitor 432 upon notification that the health check monitor has been initiated. In some implementations, the health check monitoring process may be constantly running 24 hours a day, 7 days a week.

The system configuration information 429 includes system operational parameters of the system and application components, such as generated system events and performance values. Based on the retrieved or pushed system configuration information 429, the health check monitor 432 evaluates the operational parameters (e.g., generated events) as described in step 306 of FIG. 3. In this implementation, the health check monitor 432 determines the generated event is an incident and initiates the creation of the incident. That is, the health check monitor 432 informs the context collection 424 in the data packaging layer 408. Based on the incident, the context collection 424 automatically collects context (or diagnostic) data that is needed to resolve the incident. The context data is provided to the software problem report 426 in the data packaging layer, which generates an incident report and stores the context data. The message based integration (in) 420 in the process integration layer 406 receives the incident report and context data, other incident reports if generated, and messages from the back-end system(s) 103, such as incident handling or management activities (embedded support), such as data related to resolution of an incident. The message based integration (in) queues the incident reports and messages and provides it to the service request 418 in the service desk 408 (e.g., a CRM system), which resides in the application platform layer 404. Based on the incident report, the service desk 408 stores the incident report in the service request 418 and can attach the context data to the service request 418, which may be provided to the user interface 414 in the user interface layer 402. In some implementations, the processing of the software problem report 426 and the processing of the service request 418 may reside in different client systems 102, which is possible because of the message-based integration components 420 in the process integration layer 406.

Depending on the service level agreement between the customer and application provider and service provider, the message based integration (out) 420 in the process integration layer 406 queues outbound messages to the back-end system(s) 103, e.g., where the service level agreement requires the application provider 104 and/or the service provider system 106 to monitor the system and application components of the client system 102. In other implementations, the outbound messages may concern notification messages of the created incidents with the context data attached.

Embedded Support Service Process

Figure 5:
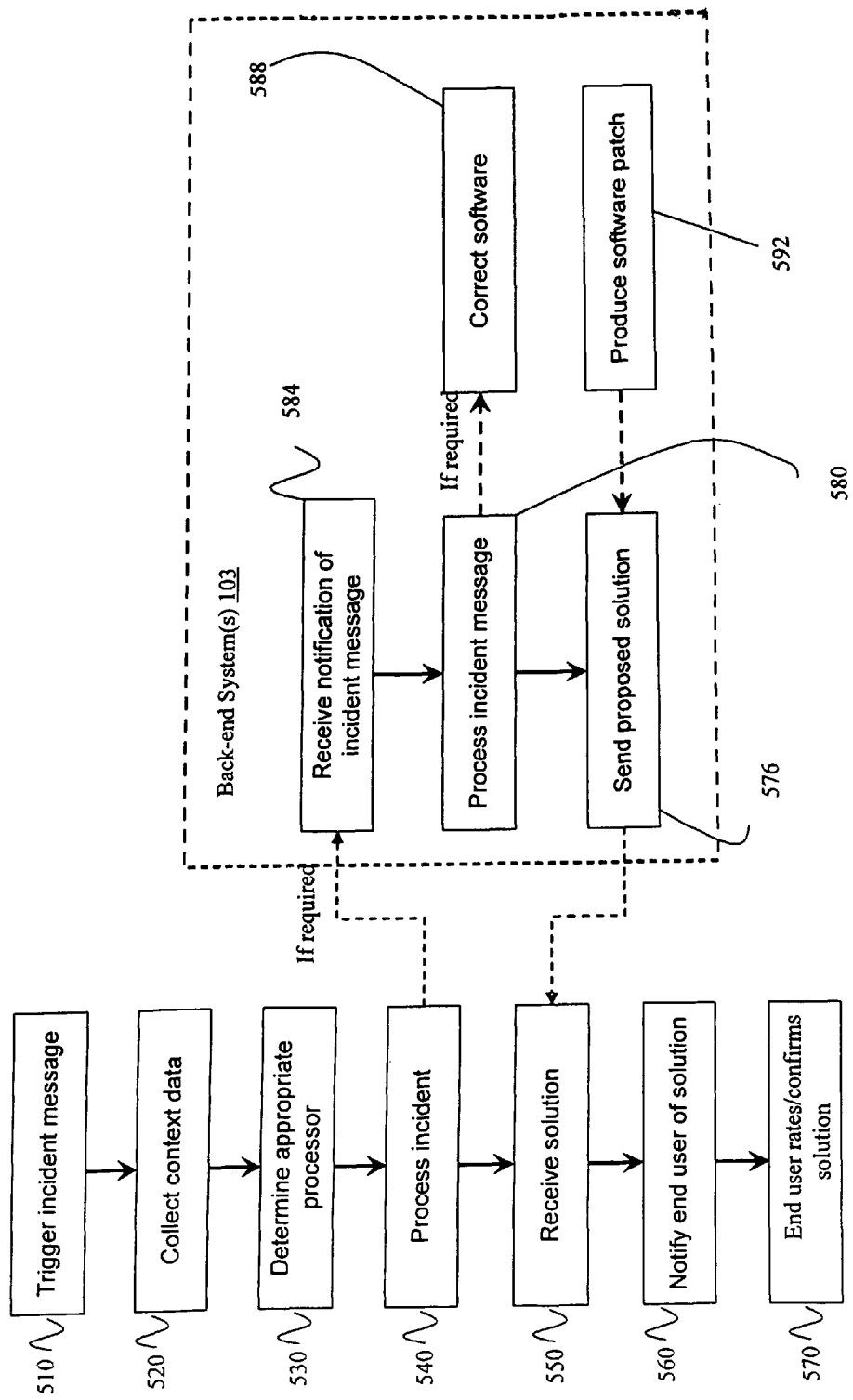
FIG. 5 is a process flow diagram of an embedded support process of an embedded support services module.

FIG. 5 is a process flow diagram of an embedded support (incident processing and management) process 500 of the embedded support services module 206. Generally, the process 500 can be implemented by an integrated service desk module that can collect, record, process, escalate, and track user and system generated incidents, initiate escalation procedures, and keep end users informed of the processing status.

The objective of incident management is typically to restore a malfunctioning IT service as quickly as possible, which can involve workarounds that do not eliminate the true cause of the malfunction. Incidents also include service requests that do not involve malfunctions, but simply request specific services, such as password reset. The objective of problem management is typically to permanently reduce the number and impact of incidents by tracking down the causes of malfunctions, providing workarounds, and initiating the changes needed to correct the errors.

The process 500 is initiated at 510 when an end user or the system triggers an incident message. An end user can start a support request (e.g., report an application error) from any view of the end user's UI 204, e.g., by clicking on a support button depicted in a view of the UI 204 (such as a self-services view of a control center UI). System-initiated incidents can be those incidents initiated by the health check monitoring process and architecture described with reference to FIGS. 2 and 3, respectively, such as such as those triggered either from the technical infrastructure or critical error situations that occur from within an application (e.g., termination of critical batch jobs or failure of mission-critical interfaces). In some implementations, a wizard can be started and presented to the user as soon as the end user initiates the service request to correct the malfunctions automatically, without requiring intervention by an appropriate processor, such as the key user, IT administrator, or back-end support staff, such as a wizard for solving printing problems.

If the wizard does not help the end user to solve the incident (in those implementations providing a wizard) or the incident message is system initiated, then after initiation of the support request (i.e., a user initiated incident message) or system initiated incident message, at 520, the system collects context or diagnostic information from all levels of the technology stack and from the application and saves it with the service request or system initiated incident message, as described with reference to the health check monitoring process with reference to FIGS. 3 and 4. As described above, this context information is detailed enough to enable the appropriate processor (e.g., the key user, the IT administrator and/or back-end support staff) to analyze the error associated with the support request or system initiated incident message quickly and easily, and identify possible causes of the error without having to logon to the client system 102 (if the support requested is escalated to the back-end system(s) 103) or recreate the problem or error.

In particular, the context information can be collected from, for example, the user interface 204 of the end-user (e.g., which view was active, which fields were visible, where was the cursor, which values did the end-user enter, browser settings, operating system, memory, CPUs, etc.), the portal (e.g., in which role did the user log on, which work sets belonged to it, which authorization objects were assigned to the user, etc.), the application (e.g., which process was the user running, what was the content of the most important memory-resident objects, relevant configuration settings, etc.), and the technical software and hardware components of the client system 102 (e.g., which software version does the customer use, which support package level, which database is used, which database version, which operating system, which application server, how much memory and how many CPUs does the server have, etc.). Because the greatest time factor in correcting malfunctions and errors is usually tracking down their cause due to the complexity of system architecture, which requires profound knowledge in several different areas to find the problem, automatically collecting all significant context data associated with the cause of the system-initiated incident or service request at the time the incident occurred or at the time a user initiated the request, greatly simplifies the incident and problem management process.

At 530, the appropriate processor is determined by the system, i.e., whether the IT administrator or a key user, or back-end support staff processes the system-initiated incident message or service. In some implementations, the key user is the first level of support for service requests from end users, and will be determined to be the appropriate processor. In some implementations, the IT administrator is the appropriate processor for system-initiated incident messages. In some implementations, the back-end support staff is determined to be the appropriate when system-initiated incidents, e.g., critical errors, or certain service requests satisfy criteria provided in a service level agreement. In this implementation, at 530, the appropriate processor is determined to be the key user who is assigned to the department in which the end user works.

Next, at 540, the key user processes the system-initiated incident or service request. The appropriate processor, such as the key user, can solve the incident or search request by using a variety of tools, such as a solution database and wizards. The solution database contains workable solutions to known problems. The results retrieved from a search of the solution database can be improved by using the context information collected during the recording process as search criteria. As a result, only relevant solutions are found. Wizards provide system support to analyze error situations and correct their causes. A wizard for support staff, such as a key user and IT administrator, can be started automatically when the key user or IT administrator processes a service request or system-initiated incident to analyze the context and propose solutions. Wizards contain program logic to evaluate the collected context information. A wizard can be used to help resolve frequent problems that occur in pricing, for example, or interface-related problems. In some implementations, wizards can be downloaded from the back-end system(s) 103. In some implementations, the system-initiated incident or service request may be automatically routed to the backend system(s) 103, without any key user or IT administrator processing.

If the key user or other appropriate processor is unable to resolve the incident, he or she can forward the incident (system or user-initiated) and associated context data to the back-end system(s) 103 for processing and can track the processing status through a view of key user's UI 204. In that case, at 584, the back-end system 103, e.g., the service provider 106, receives the incident message, and then at 580, the back-end system 103 (e.g., service provider support staff) processes the incident to determine a solution. If, at 580, the determined solution requires correction to the software, then at 588, the software is corrected, usually by the application provider 104. In some implementations, the application provider 104 may have a patch to the software (592), which can be provided as a proposed solution (576). Then at 576, the proposed solution, whether a solution determined at 580 or a software patch produced at 592, are transformed into an appropriate format (e.g., XML) and sent to the client system 102. At 550, the incident is considered solved, particularly for system-initiated incidents. For user-initiated incidents (service requests), at 560, the end user is provided the solution. Then, at 570, the end user can rate or confirm that the solution has been provided and in fact resolved the incident.

Software Maintenance Process

Figure 6:
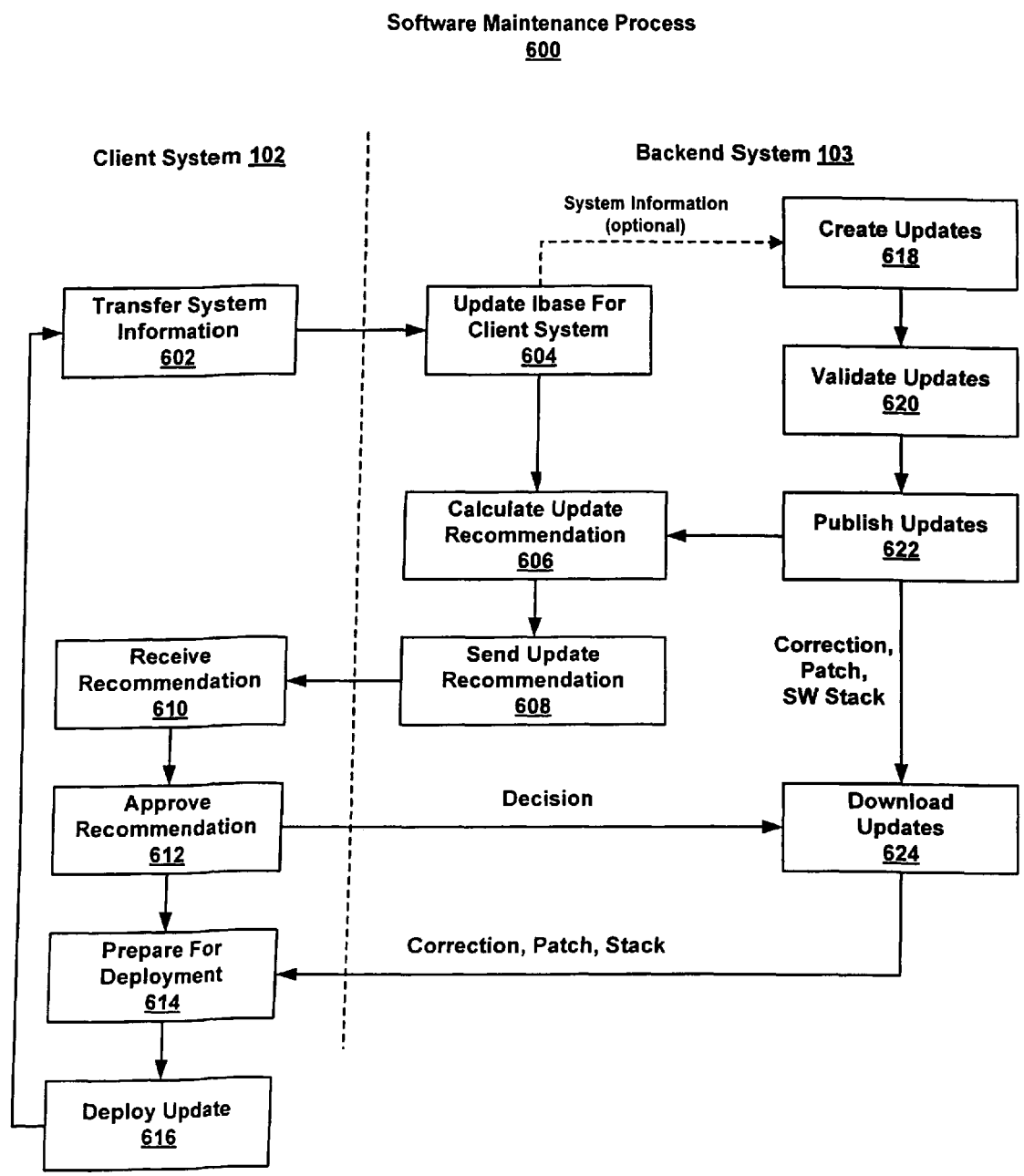
FIG. 6 is a process flow diagram of a software maintenance process of an embedded change and deploy services module 210.

FIG. 6 is a process flow diagram of a software maintenance process 600 of the embedded change and deploy services module 210. On a client system 102, at 602, one or more data collection and/or monitoring services collect and transfer system information to the backend system. The system information can be sent continuously or periodically, or in response to a trigger event initiated at the client system 102 or the backend system 103. System information includes any information associated with a client system 102, including but not limited to any information related to system components and processes, project scenarios, operation and system configurations, system status, product versions, software component vector including support package level, previously installed updates, health check monitoring, incidents, etc.

In some implementations, a data collection and/or monitoring service performs regular data exchange between the client system 102 and the backend system 103 using one or more known communication protocols (e.g., HTTP, TCP/IP, Extensible Mark Up Language (XML) messages, etc.). The service can run in the background on the client system 102 (e.g., daemon process). The network connection can be established directly between the service and the backend system or indirectly through a third party system. In some implementations, the service collects information from different sources at the client system 102 (e.g., applications, user interface, databases, operating system, etc.) and centralizes the information at a common storage location (e.g., in a buffer) at the client system 102 before sending the information to the backend system (e.g., asynchronously).

At 604, the backend system 103 receives the system information and updates a maintained repository of client system information (hereinafter also referred to as an "installed base" or "IBase"). Using information contained in the IBase, at 606, the backend system 103 determines (calculates) one or more update recommendations for the client system 102.

In some implementations, the update recommendations are software patches or corrections that are created (618), validated (620) and published (622) by the service provider (or a third party). The patches or corrections can be created based on current information in an IBase. The update recommendations can include control information for downloading one or more patches from a patch repository and deploying the patches on the client system. In some implementations, at 606, the update recommendations are calculated in response to one or more manual or automatic trigger events (e.g., an update to the installed base after a software package has been published, etc.). After determination (calculation) of the update recommendations, at 608, the update recommendations are transformed into an appropriate format (e.g., XML) and sent to the client system 102.

In some implementations, at 610, the update recommendations are received and displayed in a user interface (e.g., a web page) at the client system 102. Next, at 612, the user, such as an IT administrator, chooses how to proceed with the update recommendations, and the user's decision is sent to the backend system 103 where it is acted upon. For example, an IT administrator can choose to reject, postpone, deploy or schedule the download and deployment of all or some of the recommended updates. If the IT administrator approves the update recommendations (e.g., a decision to deploy immediately or schedule deployment), then, at 624, the updates (patches) are automatically downloaded. Then, at 614, the client system 102 is prepared for deployment and, at 616, the update is deployed. In some implementations, one or more preprocessing steps are performed after download and prior to deployment (e.g., unpacking components, checking for errors, performing optimization procedures, etc.). These preparation and preprocessing steps can be performed manually (e.g., by the IT administrator), automatically (e.g., by the backend system 103 and/or client system 102), or as a combination of manual and automatic steps. In some implementations, the user can plan the time of download and/deployment.

Continuous Improvement Service Process

Figure 7:
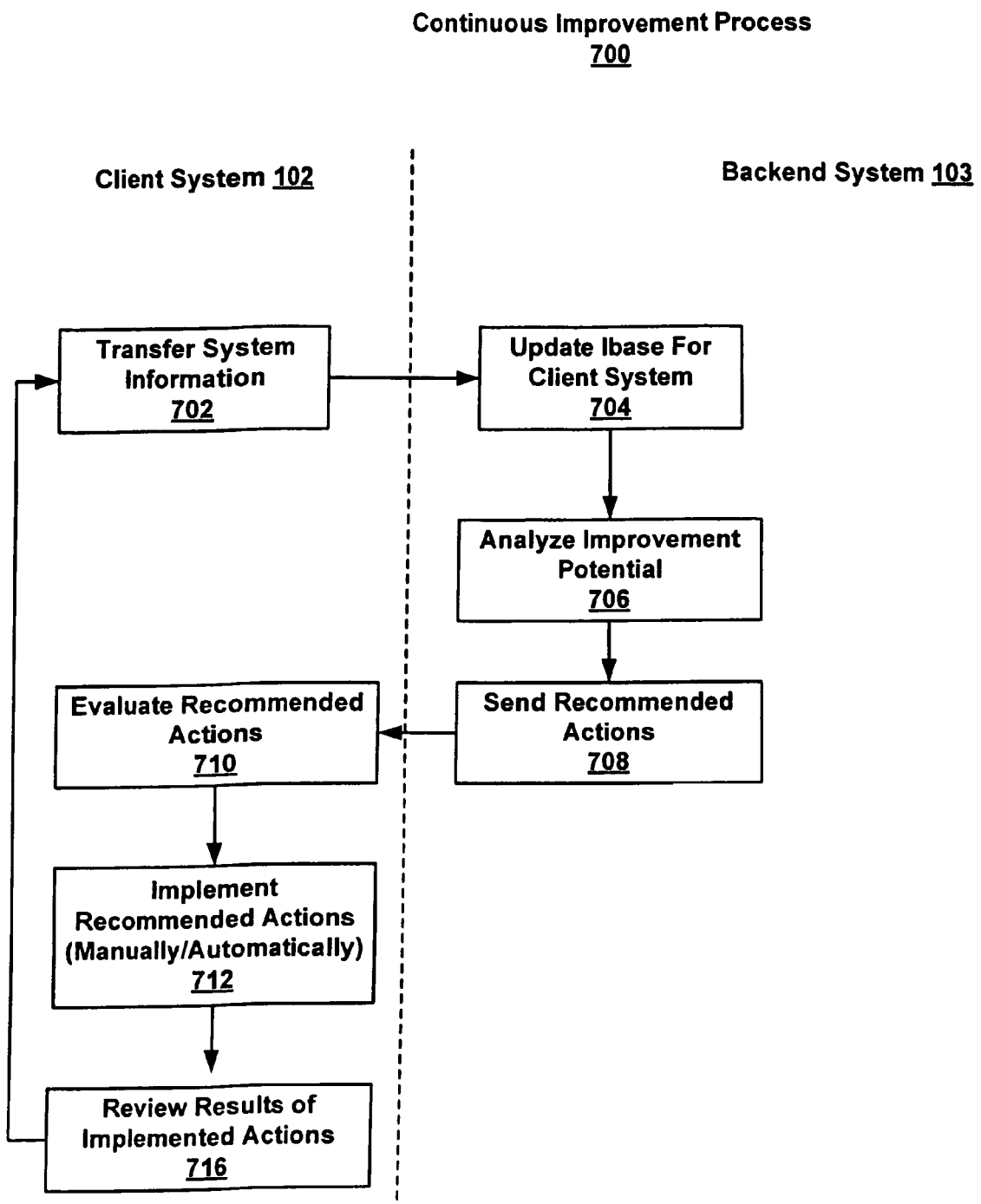
FIG. 7 is a process flow diagram of a continuous improvement process of the embedded plan and optimize services module.

FIG. 7 is a continuous improvement service process 700 of the embedded plan and optimize services module 212. On a client system 102, at 702, one or more data collection and/or monitoring services collect and transfer system information to the backend system 103. The system information can be sent continuously or periodically, or in response to a trigger event initiated at the client system 102 or the backend system 103. System information includes any information associated with a client system 102, including but not limited to any information related to system components and processes, project scenarios, operation and system configurations, system status, product versions, software component vector including support package level, previously installed updates, health check monitoring, incidents, etc.

In some implementations, a data collection and/or monitoring service performs regular data exchange between the client system 102 and the backend system 103 using one or more known communication protocols (e.g., HTTP, TCP/IP, Extensible Mark Up Language (XML) messages, etc.). The service can run in the background on the client system 102 (e.g., daemon process). The network connection can be established directly between the service and the backend system or indirectly through a third party system. In some implementations, the service collects information from different sources at the client system 102 (e.g., applications, user interface, databases, operating system, etc.) and centralizes the information at a common storage location (e.g., in a buffer) at the client system 102 before sending the information to the backend system (e.g., asynchronously).

At 704, the backend system 103 receives the system information and updates a maintained repository of client system information (hereinafter also referred to as an "installed base" or "IBase"). Using information contained in the IBase, at 706 (e.g., pre-defined benchmarks or long-term analysis), the backend system 103 determines one or more recommended actions to improve the efficiency of the client system 102. After determination of the recommended actions, at 708, the recommended actions are transformed into an appropriate format (e.g., XML) and sent to the client system 102.

At 710, the recommended actions are received and automatically or manually evaluated. For example, an IT administrator can choose to reject, postpone, implement or schedule all or some of recommended actions. In some implementations, at 710, the recommended actions can be displayed in a user interface at the client system 102 (e.g., the IT administrator's UWL in the control center UI) for ease of evaluation. In some implementations, at 710, the received recommended actions can be automatically evaluated against predefined criteria to determine whether or not to automatically implement the received recommended actions. If, for example, the IT administrator approves the recommended actions or it was determined that the recommended actions should be automatically approved and/or implemented, then, at 712, the recommended actions are automatically or manually implemented. At 716, the results of the implemented actions can then be displayed or provided to a person in charge of the client system 102, such as the IT administrator for further evaluation of the effect the recommended actions had on system efficiency.

Control Center User Interface—End User

FIGS. 8A-F are various views of an implementation of a control center user interface (UI) 800 for a system and application management architecture shown in FIG. 2, from the perspective of an end user. FIGS. 8A-F are described from the perspective of a fictitious end user named "Peter Greene." The UIs shown in FIGS. 8A-F are exemplary, as other UIs can be used as desired, including more or fewer UIs with various views, numbers and types of user interface elements, such as links, controls, search boxes, buttons, navigation bars, filters, and menus. Generally, the control center UI 800 provides an overview of the workload items a user has to work on and is the starting port for non-regular, exception-based tasks. A work center is the lowest granularity of roles, i.e., there is one work center for each job description. The work center provides the specific workload items a user has to work on a regular basis. Each workload item in a work center's work list can be propagate or escalated to a universal work list (UWL) in the control center UI 800 on the bases o a service level agreement with an alert (e.g., initial response time, mean reaction time, severity, priority, etc.).

Input to the control center UI 800 can come from various sources, such as first level support (proposed solutions and/or context information from problems requiring the IT administrator's attention); alerts from system monitoring requiring action; tasks from an operation handbook and tasks and/or updates from the back-end system(s) 103. For the IT administrators, all tasks requiring his or her attention will be pushed to the control center user interface (UI).

The system administration tasks pushed to the control center user interface (UI) are integrated with the relevant tools required for their execution. Inexperienced users can elect to use wizards to guide them step-by-step through task execution. More experienced users can process the task in expert mode, utilizing the tools with which they have become familiar. Regardless of how the task is processed, the status of the task's execution is reflected in the control center user interface (UI) 800.

Providing a "Support" button (not shown) on each view of the user interface enables the end user to seek assistance when problems occur. In turn, this is an input source for the control center user interface (UI) 800, since error situations requiring the IT administrator's attention are automatically routed there. The IT administrator has a snapshot of the application context data causing the error condition and can provide the necessary solution—through e-mail or direct connection to the user's system from the control center user interface (UI) of the IT administrator, for example, which as noted above can have the same views, but the content displayed in the views may be different because of the tasks required of an employee having the role of an IT administrator as opposed to the role of an end user. The solution to the error condition is captured automatically in the solution database; the status of the problem is available to all interested parties at all times (first level support, end user, system administrator). The clicking of the button automatically initiates a process that collects all or substantially all diagnostic or context data associated with the error that is needed to resolve the error, associates that collected diagnostic data with a problem or incident report, and generates a service request that is associated with the collected data and presented to the appropriate processor. This can be done without any end-user interaction other than clicking the button (or alternatively voice activating the button or process) and, in some implementations providing a text message or voice describing the error. After a solution to the service request is determined by the appropriate processor and reported to the end user, the end user can be required to confirm the solution before the service request can be declared resolved.

Figure 8A:
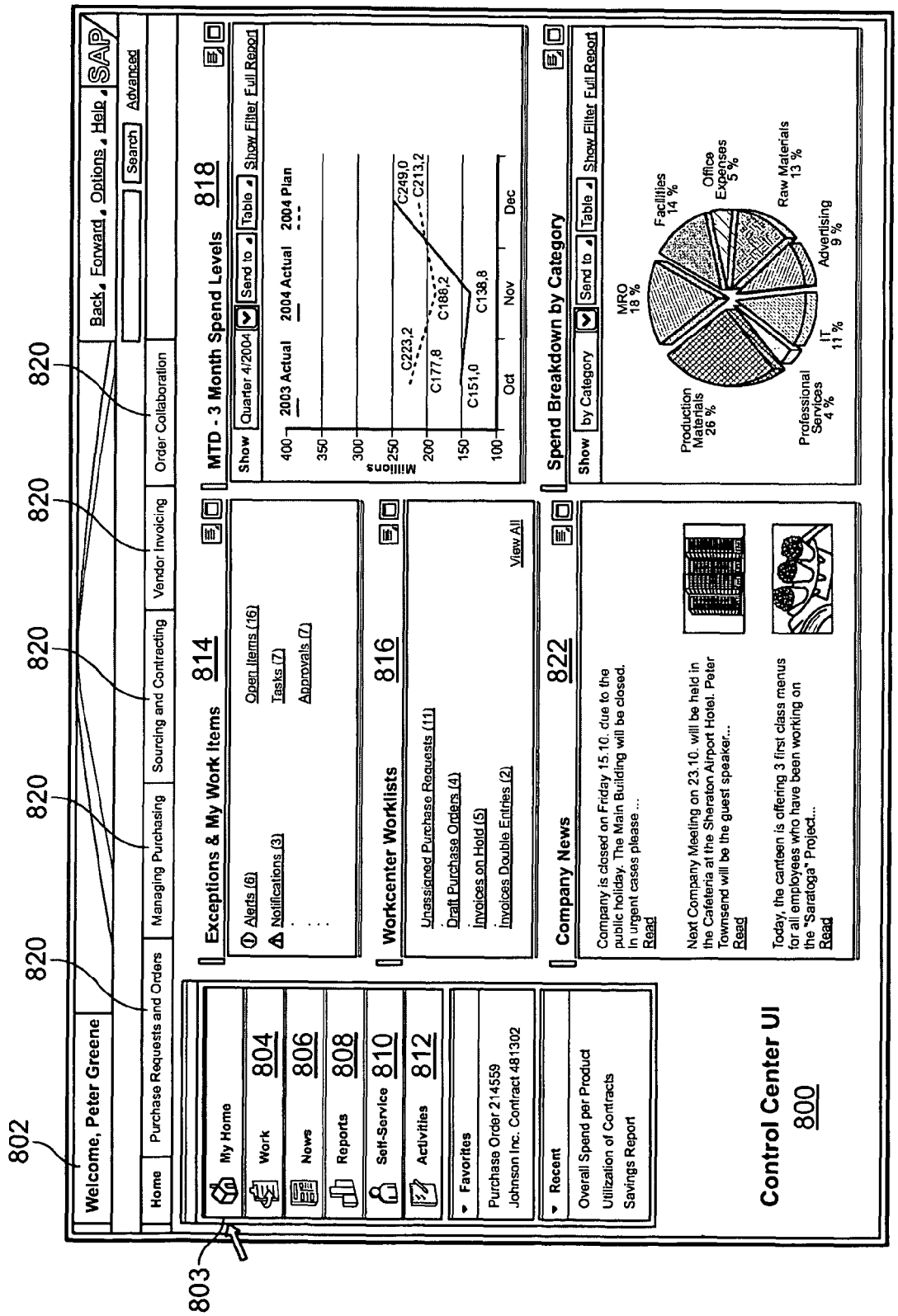

FIG. 8A illustrates an example of a home page view of a control center user interface 800 of the system and application management architecture shown in FIG. 2, respectively, from the perspective of an end user. The control center user interface 800 can be the initial starting point for an end user, such as an IT administrator, after logon. The control center user interface 800 can present summarized information from some or all work centers assigned to the end user. As can be seen, an end user typically does not have any system and application management work enters assigned, so interactions with system and application management process can be performed in the Self-Service View 810, where a support request button can be provided. In this implementation, the control center user interface 800 includes a My Home view 803, a Work Inbox view 804 (e.g., a UWL), a News View 806, a Reports view 808, and a Self-Service view 810 and an Activities View 812. The My Home view 803, which is shown in FIG. 8A, is the first screen an end user sees after login. The Work Inbox view 804 contains alerts and notifications in an e-mail inbox list. The work inbox view 804 also can include administration tasks that are urgent, very import, escalated or overdue. The Report view 808 contains all reports available in the different work centers. The News view 806 contains, among other company news, a system news page, where IT administrators can post important information about the system status. The system news page in the News view 806 can be available to every user. The Self-Service view 812 contains, among other self-service applications, an application where every user can create a problem message, e.g., an incident or request a service, e.g., for a change of authorization in the system) from the IT department. The service request application in the Self-Service view 810 can be available to every user.

The end user, Peter Greene logs onto "home" page after logon, and automatically is presented with the "My Home" view page 803. Alternatively, if Peter was in another view, he can use his mouse cursor 812 to click on the "My Home" view button 803, which would enable Peter to view an overview of his environment, including a Exceptions & My Work Items monitor 814, Work Center Work Lists monitor 816, a work center overview monitor 818 (in this case "MTD-3 Month Spend Levels" and "Spend Breakdown by Category") and a Company News monitor 822. The work centers 820 that Peter is assigned to as an end user include Purchase Requests and Orders, Managing Purchasing, Sourcing and Contracting, Vendor Invoicing and Order Collaboration. Listed under the Exceptions & My Work Items 814 include, e.g., Alerts and Notifications. In this example, there are six alerts and three notifications. Listed under the Work Center Work Lists monitor 816 are categories including, e.g., unassigned purchase requests (11), draft purchase orders (4), invoices on hold (5) and invoices double entries (2). The Company News monitor 822 can be used to provide a summary of recent company information, such as human resources notices or meeting announcements. The work center overview monitor 518 provides a summary of Peter's work centers.

Figure 8B:
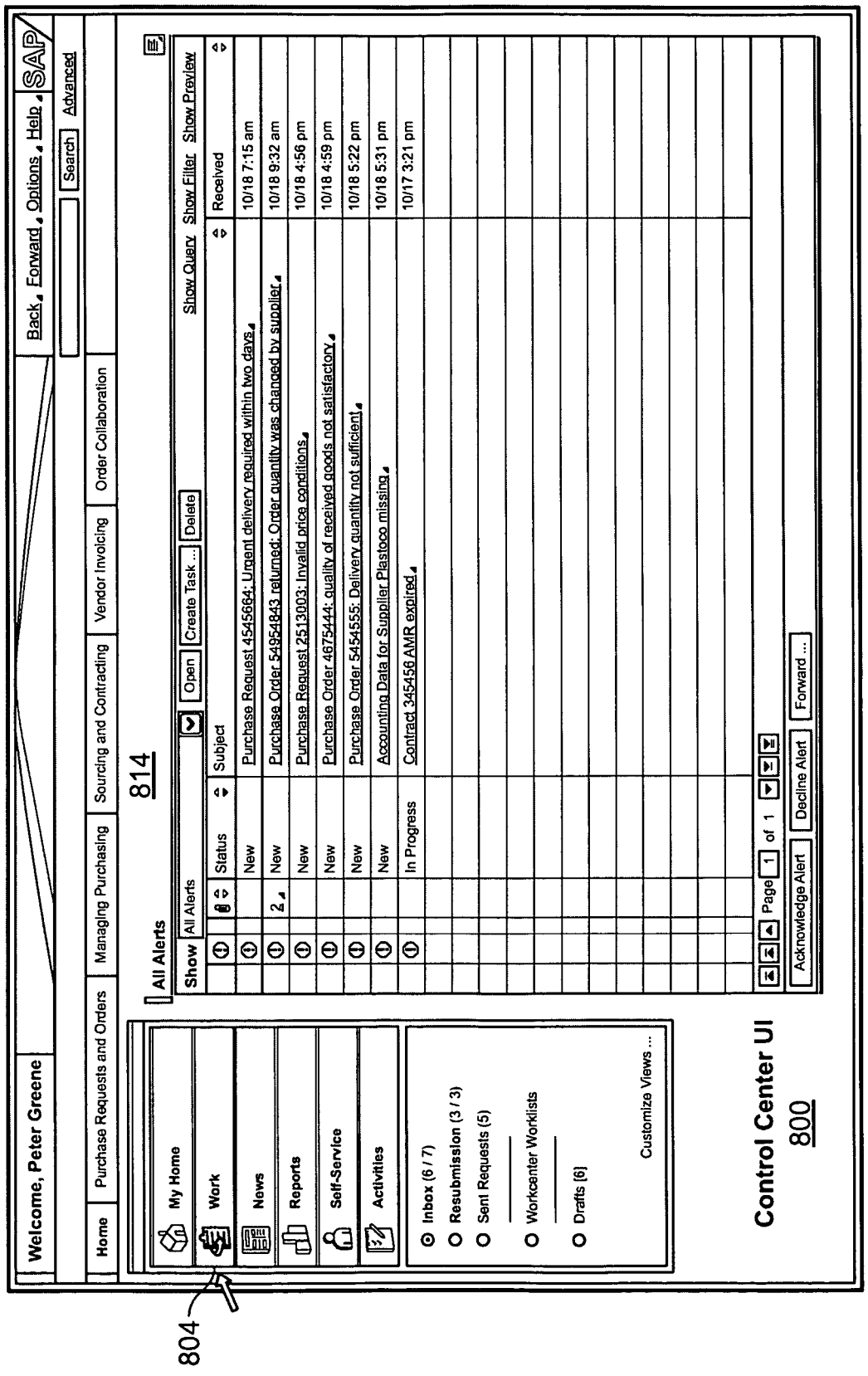

FIG. 8B illustrates an example of a work view 804 of a control center user interface 800 of the system and application management architecture shown in FIG. 2, respectively, from the perspective of an end user. As noted above, the Work Inbox view 804 contains alerts and notifications in an e-mail inbox list. The work inbox view 804 also can include administration tasks that are urgent, very import, escalated or overdue. Here an All Alerts monitor 814 is provided, which Peter had selected to show. The All Alerts monitor 814 depicts all alerts sent to Peter.

Figure 8C:
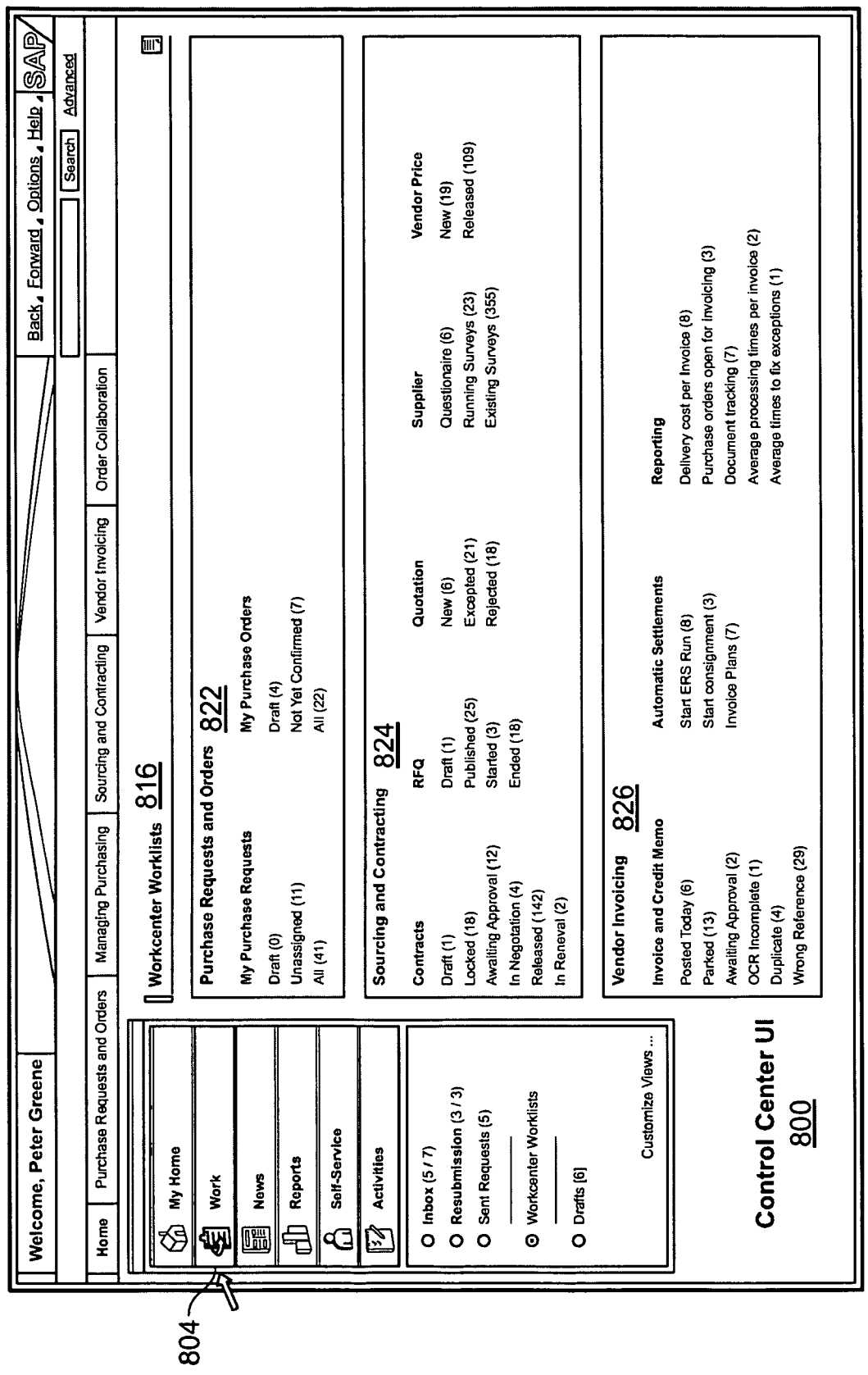

FIG. 8C illustrates an example of a work view 804 of a control center user interface 800 of the system and application management architecture shown in FIG. 2, from the perspective of an end user, in which the Work Center Work Lists monitor 816 is depicted in full view. Here the detailed view of the Work Center Work Lists monitor 816 includes a purchase requests and orders monitor 822, a sourcing and contracting monitor 824 and vendor invoicing monitor 826.

Figure 8D:
Figure 8F:
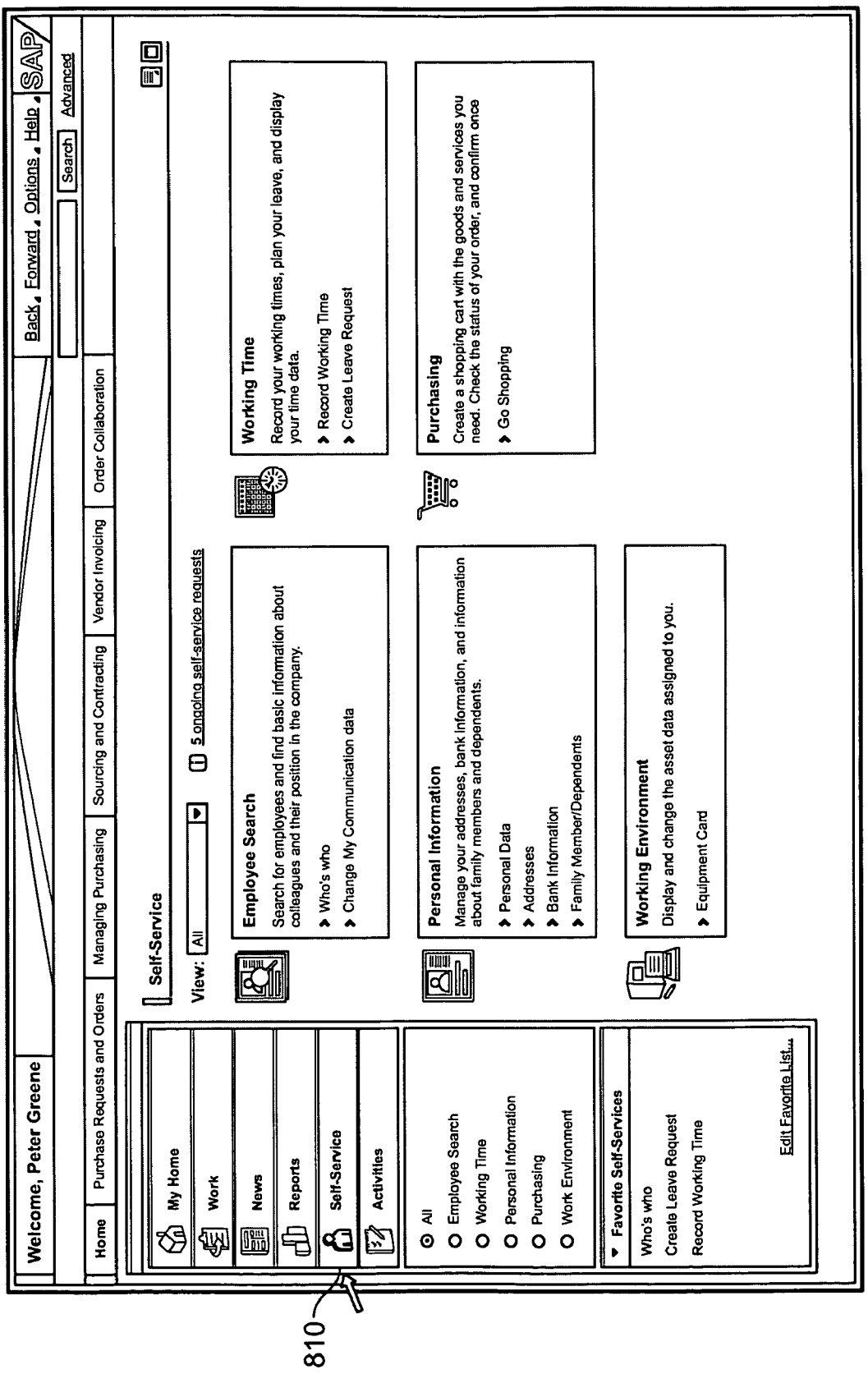

FIG. 8D illustrates an example of a News view 806 of a control center user interface 800 of the system and application management architecture shown in FIG. 2, from the perspective of an end user. FIG. 8E illustrates an example of a Reports view 806 of a control center user interface 800 of the system and application management architecture shown in FIG. 2 from the perspective of an end user. Here, the end user, Joanne Miller, has itemized her reports grouped by her work centers. FIG. 8F illustrates an example of a Self-Service view 810 of a control center user interface 800 of the system and application management process and architecture shown in FIG. 2, from the perspective of an end user In this view 810, the end user, Peter Greene, may perform an employee search, change his personal information, record his working time or purchase goods and services, etc.

User Interface—IT Administrator

FIG. 9-13 illustrate views of an implementation of a control center user interface (UI) 900 of the system and application management architecture shown in FIG. 2, from the perspective of an IT administrator. FIGS. 6-9 is described from the perspective of a fictitious IT administrator user named "Jeff Goldblume." The UIs shown in FIGS. 9-13 are exemplary, as other UIs can be used as desired, including more or fewer UIs with various views, numbers and types of user interface elements, such as links, controls, search boxes, buttons, navigation bars, filters, and menus.

Control Center User Interface—IT Administrator

Figure 9:
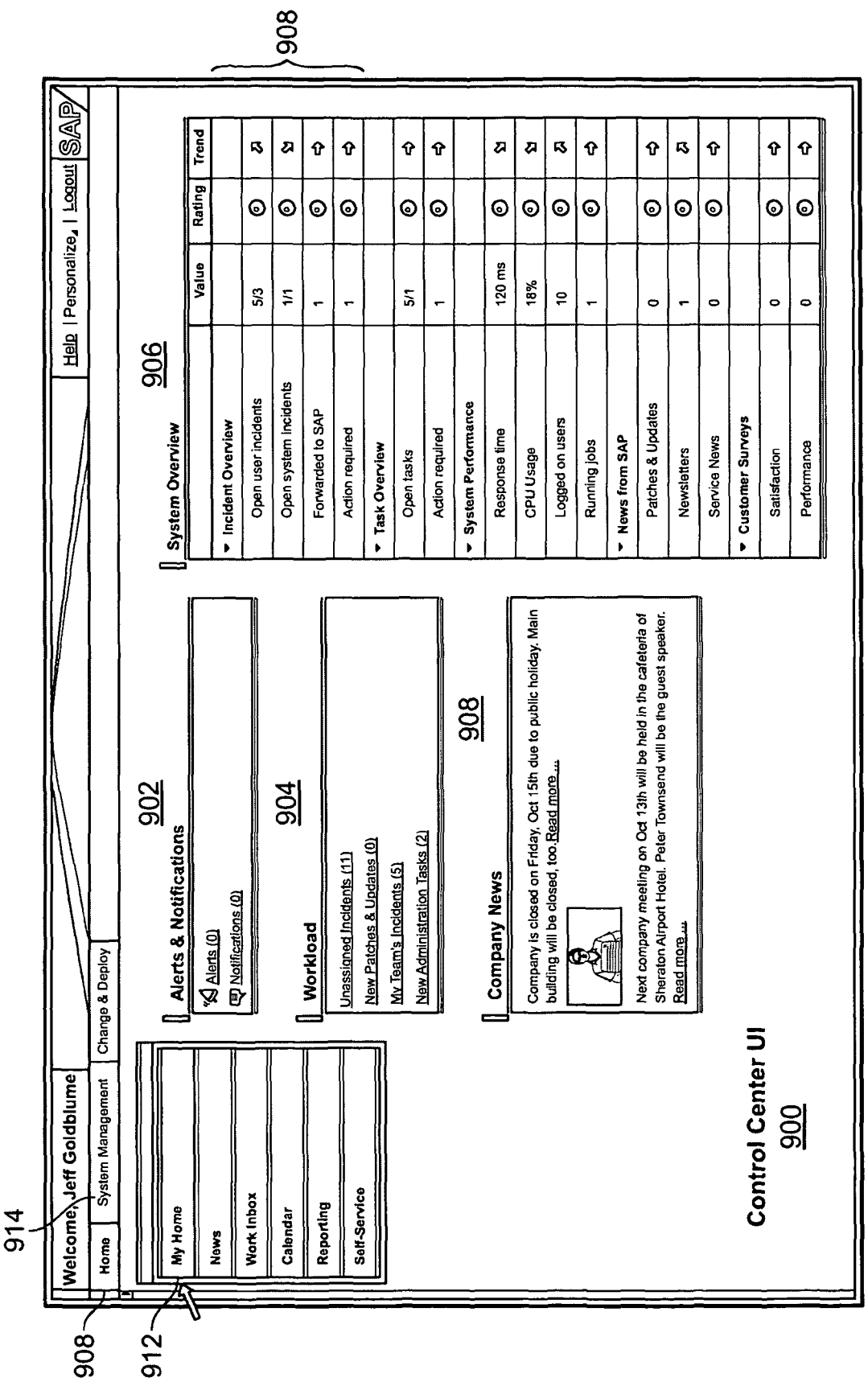
FIG. 9 is a view of a control center UI suitable for use by an IT administrator.

FIG. 9 is a view of a control center user interface 900 for a IT administrator. The user interface presents summarized information from all work centers assigned to the IT administrator. In this implementation, the user interface 900 includes a My Home view, a News view, a Work Inbox view, a Calendar view, a Reporting view, and a Self-Service view, which have been described with reference to FIGS. 9-13.

As shown in FIG. 9, the IT administrator, Jeff, logs onto the "home" page 912 after logon, and uses his mouse cursor 912 to click on a "My Home" view button, which enables Jeff to view a system overview of his environment, including a Alerts & Notifications monitor 902, a Workload monitor 904, a System Overview monitor 906, and Company News monitor 908. Listed under the Alerts & Notifications monitor 904 are categories Alerts and Notifications. In this example, there are no alerts and notifications. Listed under the Workload monitor 904 are categories, including, e.g., unassigned incidents, new patches & updates, my team's incidents and new administration tasks. In this example, there are eleven unassigned incidents, which are indicated by the number 11 in parentheses. There are five incidents noted for my team's incidents and two new administrative tasks. The Company News monitor 908 can be used to provide a summary of recent company information, such as human resources notices or meeting announcements.

The System Overview monitor 906 provides a summary of the system and includes monitors, such as an incident overview monitor 908, a task overview monitor, a system performance monitor, a news monitor and a customer surveys monitor. As can be seen, the incident overview monitor 908 includes categories such as open user incidents, open system incidents, forwarded to an application provider (e.g., SAP), and action required. Each of these categories can be associated with a value, rating, and trend. In some implementations, the rating is color coded, so that Jeff can quickly determine the status based on the color. An example color coding scheme could be green for normal and red for error or problem. In some implementations, the trend is represented by an arrow icon oriented in various positions, so that Jeff can quickly determine the trend based on historical data associated with that particular category. An example orientation scheme could be an arrow slanted upward for a trend increase, an arrow oriented in a horizontal state for a neutral trend, and an arrow slanted downward for a trend decrease. If Jeff wants to view the status of system management or work on management activities associated with, for example, incidents and administration tasks, he uses his cursor 912 to select the "System Management" button 913 by clicking on it.

In some implementations, a summary fact sheet area can be provided in the "My Home" view window of, e.g., home page 912 of the control center UI 900. In some implementations, the summary fact sheet area can be provided in the "My Home" view window of a control center UI of a key user, end user or other user. The summary fact sheet can include contract (service level agreement) information, such as type of service, partner for operation, partner statistics, etc., and services information, such as the status of certain services such as a health check monitoring process, a continuous improvement service, and sign of life service (e.g., continuous or regular data exchange between the client system 102 and the back-end system 103). A link can be provided to access a detailed fact sheet 1050, which is illustrated in FIG. 10.

As shown in FIG. 10, the detailed fact sheet 1050 may be associated with a view of the control center UI for any user (such as the My Home view or others), which can be accessed through a link located in the view. The fact sheet contains on one page all the information that is needed to clearly show who is responsible for handling IT problems, incidents, tasks, service requests, etc. The detailed fact can include information pertaining to contracts & contracts 1052, IT organization 1054, external interfaces 1056 (i.e., contacts at a third party), collaboration scenarios 1058, system monitoring data 1060, active services 1062 and your business 1064 (e.g., summary data pertaining to the user's roles)

Systems Management Work Center User
Interface—IT Administrator

Figure 11:
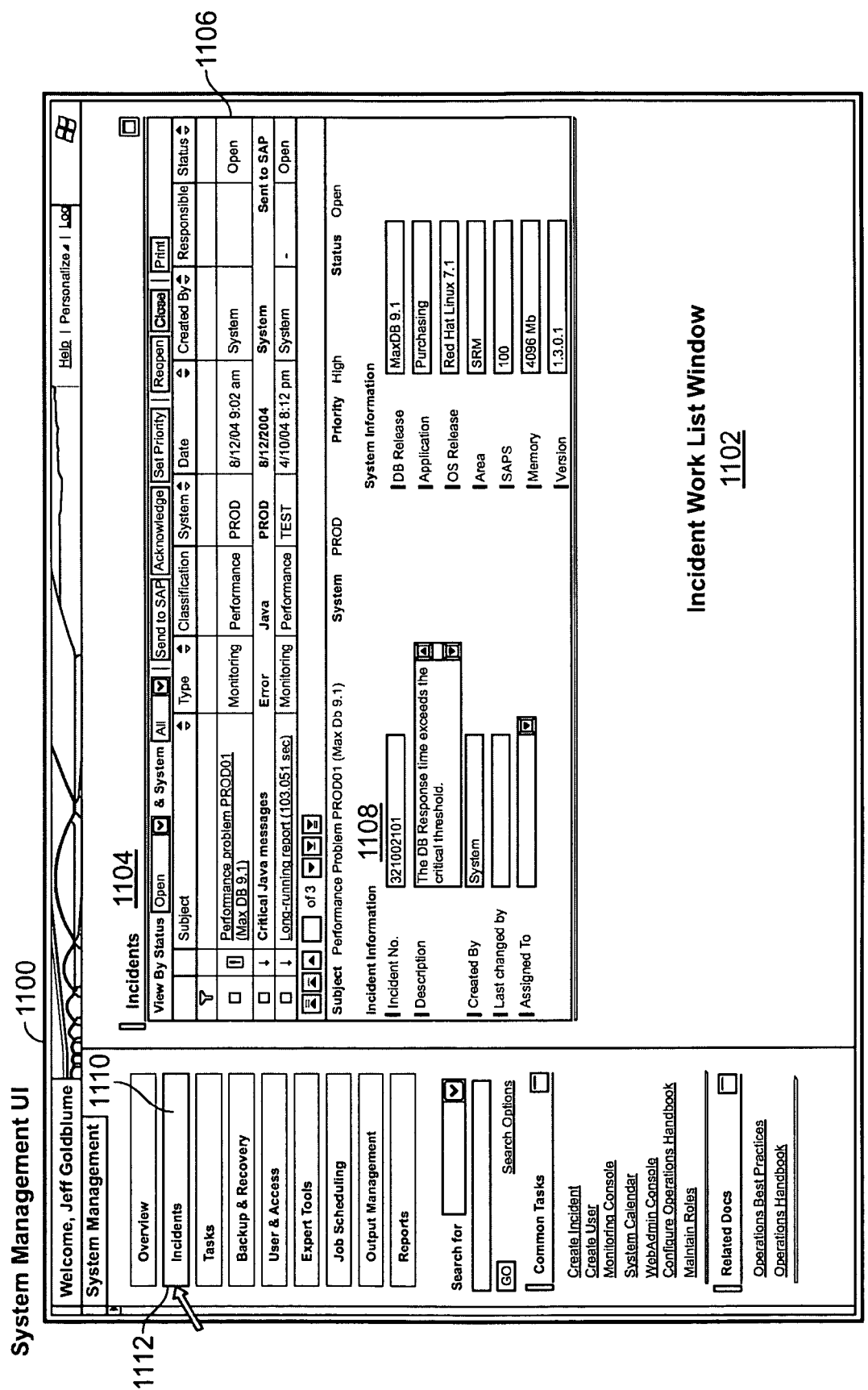
FIG. 11 is a view of a systems management work center UI for use by an IT administrator.

In response to the button 913 (of FIG. 9) being clicked, a system management UI 1100 is displayed as shown in FIG. 11. The system management UI 1100 includes views including, e.g., overview, incidents, tasks, backup & recovery, user & access, expert tools, job scheduling, output management and reports. Jeff uses his cursor 1112 to select the "incidents" button 1110 that is associated with the incidents category to view a list of the incidents (e.g., active, pending and resolved incidents), which causes the display of a incident work list window 1102, which includes an incident work list 1104 and incident information 1108 concerning a selected incident 1106. The incident information 1108 includes, e.g., an incident number associated with the incident 1106. Here, the incident number is "321002101." In some implementations, Jeff can view more detailed information about a specific incident (whether generated by the health service described herein or a user-initiated incident). One such implementation is shown in FIG. 12.

Figure 12:
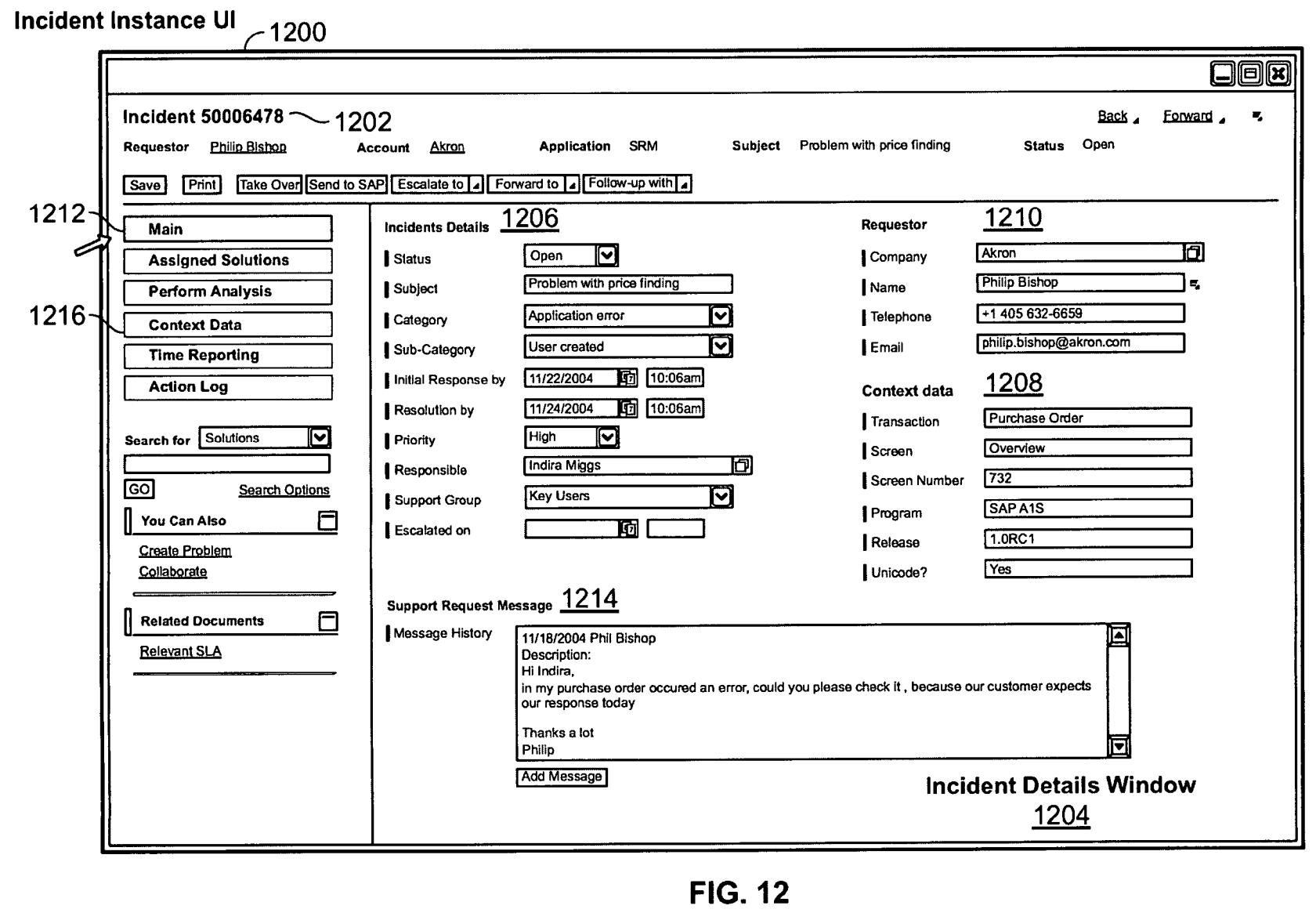

FIG. 12 is a view of an incident instance user interface 1200 of the system and application management architecture shown in FIG. 2. The user interface 1200 illustrates one implementation of depicting detailed information concerning a particular incident 1202, which was user created. The incident 1202 can have a incident number associated with it that can be generated by a service desk for ease of tracking the incidents. Here, the incident 1202 has a tracking number "500006478."

The user interface 1200 includes various categories, which are located on the left side of the screen and include, e.g., main, assigned solutions, perform analysis, context data, time reporting and action log. Jeff can select the "main" button with his cursor 1212. After clicking on the "main" button, an incident details window 1204 is displayed. The incident details window 1204 includes an incident details section 1206, a context data section 1208, a requestor information section 1210, and a support request message section 1214. The incident details section 1206 may include information relating to a status, a subject, a category, a sub-category, an initial response by date, a resolution by date, a priority, a responsible party for handling the incident, a support group and an escalated on date. As can be seen, the "sub-category" information notes that the incident 1202 is user created. The requestor information section 1210 may include information relating to a company which made the service request, a name of the contact person at the company, a telephone number and an e-mail of the contact person. The support request message section 1214 provides a message history relating to the incident 1202. The context data section 1208 may include information such as the transaction type, the screen where incident occurred, the screen number and the program in which the incident occurred, the release number of the program and whether the program is Unicode or not. Jeff may obtain more detailed context data by selecting the "context data" button 816 of the incident instance UI 1200.

User Interface—Incident Context Data

FIG. 13 is a view of an incident context data user interface 1300 of a system and application management architecture shown in FIG. 2. User interface 1300 may be displayed, for example, in response to Jeff selecting the "context data" button 1216 of FIG. 12. In this implementation, however, the context data 1302 is related to an incident that different than the incident 1202 of FIG. 12. The user interface 1300, includes all the context (diagnostic) data, e.g., technical and application information, that is usually required to resolve the incident. The context data can include, e.g., relevant system and application information from all architectural layers, such as a user interface layer, enterprise service layer, a business object layer and a system layer. The user interface 1300 has two views—a content view 1304 and a provider properties view 1306. The content view 1304, includes a snap-shot of the log files and system information 1306 associated with the incident, which was previously collected and stored. The provider properties view 1306 may include, e.g., detailed information about system and application components providing context data.

Client System Architecture

Figure 14:
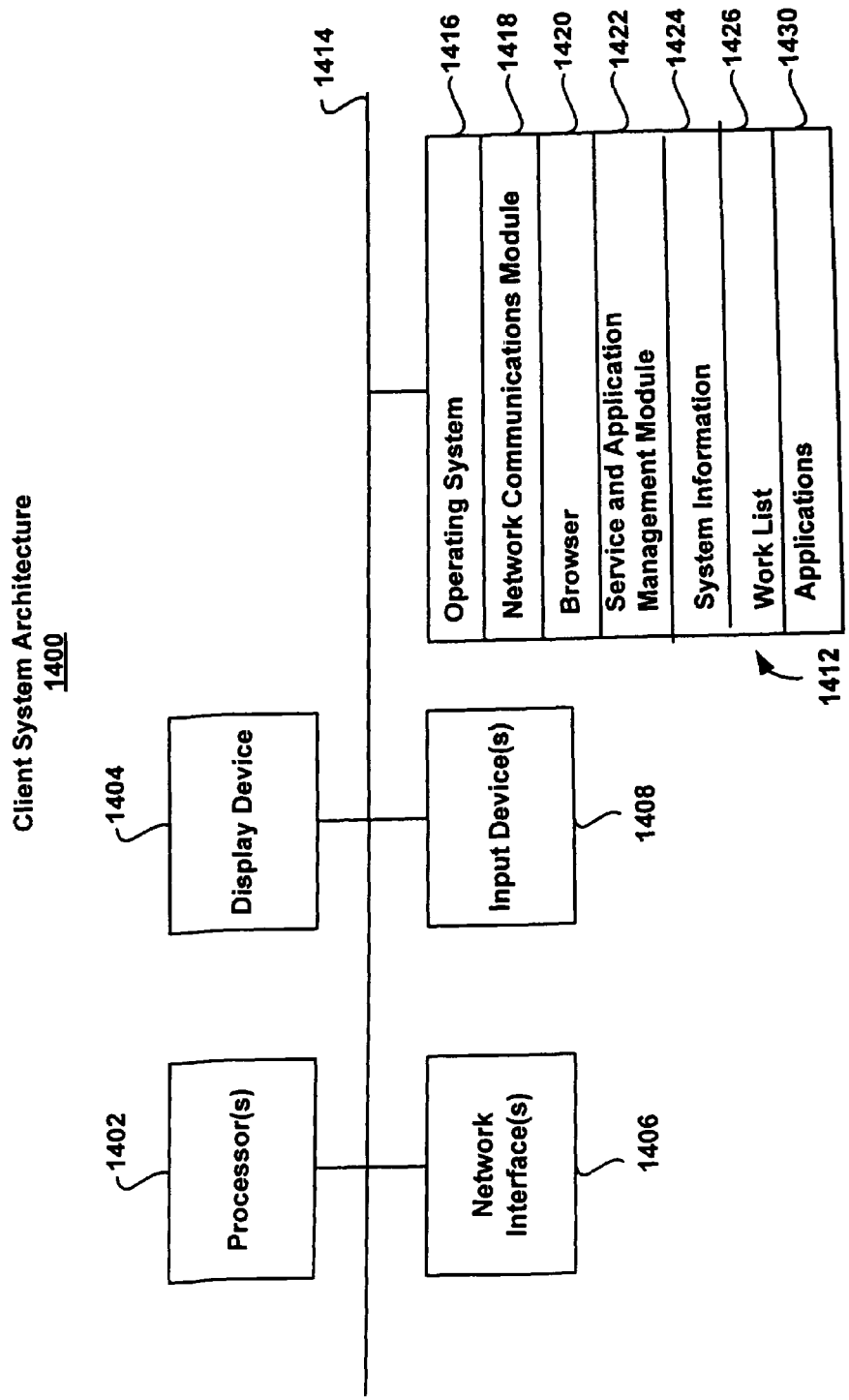
FIG. 14 is a schematic diagram of a client system architecture suitable for the service and application management techniques disclosed herein.

FIG. 14 is a schematic diagram of a client system architecture 1400 suitable for the heath check techniques disclosed herein. The architecture 1400 includes one or more processors 1402 (e.g., CPU), a display device 1404, one or more network interfaces 1406 (e.g., an Ethernet card), one or more input devices 1408 (e.g., a mouse and/or a keyboard) and one or more computer-readable mediums 1412. Each of these components is coupled by one or more buses 1414 (e.g., EISA and/or PCI). The term "computer-readable medium" refers to any medium that participates in providing instructions to the processor 1402 for execution, including without limitation, non-volatile media (e.g., optical, NOR or NAND flash, ROM or magnetic disks), volatile media (e.g., RAM) and transmission media. Transmission media includes, without limitation, coaxial cables, copper wire and fiber optics. Transmission media can also take the form of acoustic, light or radio frequency waves.

The computer-readable medium 1412 further includes an operating system 1416 (e.g., Windows®, Unix or Linux), a network communications module 1418, a browser 1420, a services and application management module 1422, system configuration information 1424, a work list 1426, and one or more applications 1430 (e.g., a suite of business applications). The operating system 1416 can be multi-user, multi-processing, multitasking, multithreading, real-time and the like. The operating system 1416 performs basic tasks, including but not limited to: recognizing input from input devices 1408; sending output to the display device 1404; keeping track of files and directories on storage devices 1412; controlling peripheral devices (e.g., disk drives, printers, etc.); and managing traffic on the one or more buses 1414.

The network communications module 1418 includes various components for establishing and maintaining network connections (e.g., software for implementing communication protocols, such as TCP/IP, HTTP and Ethernet). The browser 1420 is used to display the various user interfaces shown in FIGS. 8-13. The service and application management module 1422 performs health check monitoring processes, incident processing and management processes, software maintenance and updating processes, continuous improvement processes and other processes described with reference to FIGS. 1-13. In some implementations, some or all of the processes performed by the service and application management module 422 can be integrated into the operating system 1416. The system configuration information 1424 includes configuration data describing the status of the system and application components of client system 1402. The incident work list 1426 is described with respect to FIG. 9. Applications 1430 can include any software applications, such as business applications, word processors, email applications, Instant Messaging, media players, and telephony software.

Back-End System Architecture

Figure 15:
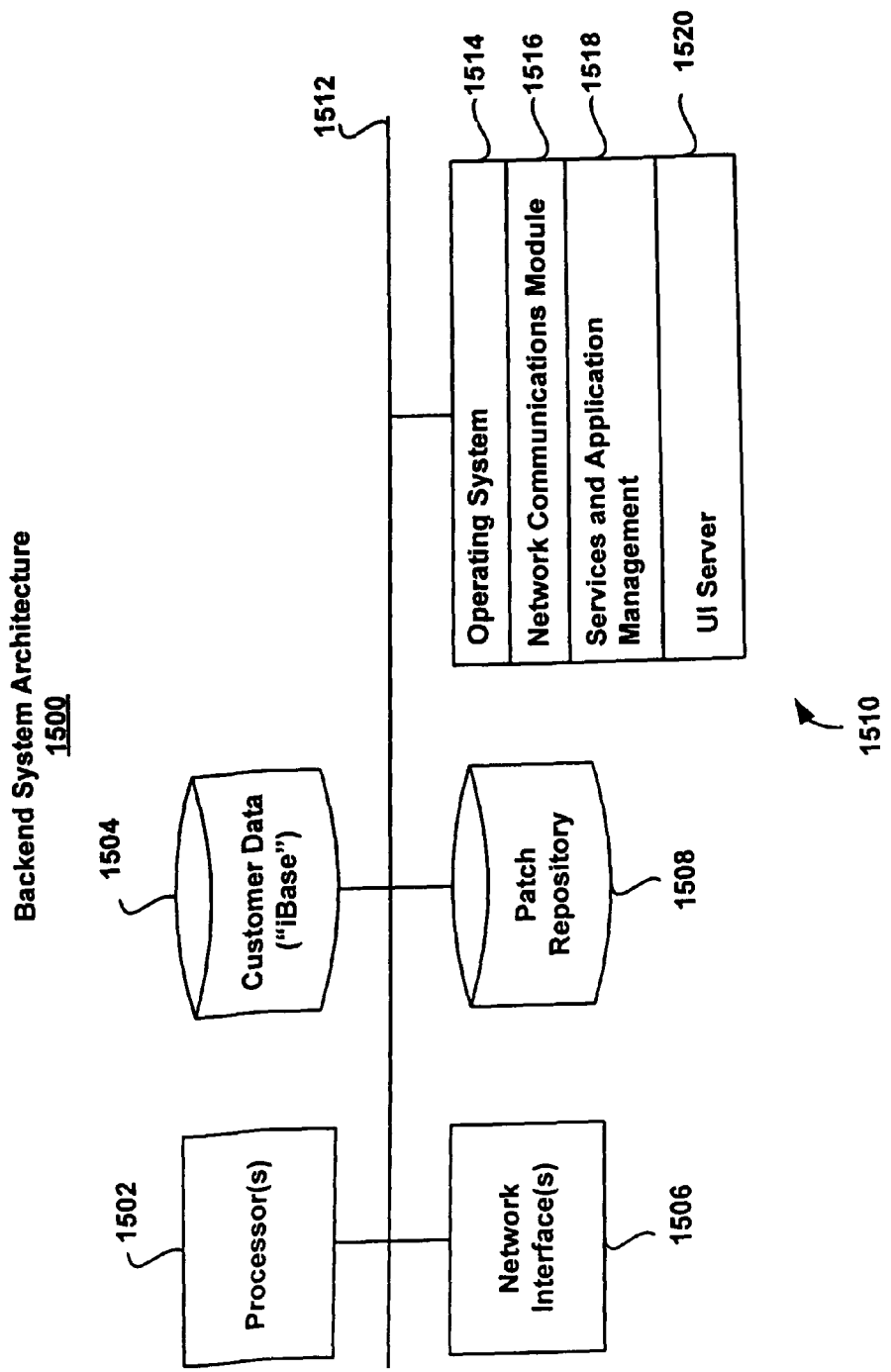
FIG. 15 is a schematic diagram of a backend system architecture suitable for the service and application management techniques disclosed herein.

FIG. 15 is a block diagram of a backend system architecture 1500. The architecture 1500 includes one or more processors 1502 (e.g., CPU), a client system information repository 1504 (e.g., a customer database and/or directory), one or more network interfaces 1506 (e.g., Ethernet, etc.) and one or more computer-readable mediums 1508. Each of these components is coupled to one or more buses or networks 1510.

The computer-readable medium(s) 1512 further includes an operating system 1514 (Windows NT®, Unix, Linux, etc.), a network communications module 1516, a software maintenance manager 1518 a UI server 1520 and one or more services 1522. The operating system 1514 can be multi-user, multiprocessing, multitasking, multithreading, real-time and the like. The operating system 1514 performs basic tasks, including keeping track of files and directories on storage devices 1504, 1508, and managing traffic on one or more buses 1510, etc.

The network communications module 1516 includes various components for establishing and maintaining network connections with a client system (e.g., software for implementing communication protocols, such as TCP/IP, HTTP, Ethernet, XML, etc.). The services and application management component 1518 provides various software components for performing some of processes described with respect to FIGS. 1-13, including download and deployment services, continuous improvement services, and incident processing and management services. In some implementations, some or all of the processes performed by the services and application management module 1518 can be integrated into the operating system 1516. The UI server 1520 generates a user interface for presentation at a client system (e.g., a web server).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, steps in a flow diagram may be replaced with other steps, additional steps may be added, some steps optionally may be removed, and/or steps may be performed in a different order, or in parallel, relative to the order depicted. Accordingly, other embodiments are within the scope of the following claims.

What is claimed is:

1. A computer implemented method of managing software installed on a client system, the method comprising the following steps performed by one or more processors:
   initiating at least two embedded services integrated with the software installed on the client system, wherein the embedded services comprise i) a health check monitoring service to automatically trigger one of a system incident message and an administrative task message in response to a generated event, ii) a support service to handle at least one of a system incident message and a user incident message, iii) a software maintenance service to automatically deploy at least one software update to the software installed on the client system, and iv) a continuous improvement service to implement at least one recommended action to improve an efficiency of the client system;
   aggregating information outputted from the initiated embedded services; and
   displaying the aggregated information in a graphical user interface;
   wherein the health check monitoring service:
      selectively recognizes at least one generated event, each generated event being received if the event triggers at least one predetermined logical rule;
      determines, for each received event, whether the received event has an associated predefined task;
      initiates a generation of a system incident message for each received event not having an associated predefined task; and
      initiates a generation of an administrative task for each received event having an associated predefined task;
   the support service:
      receives an incident message generated by at least one of a client system resource and an end user, the incident message including collected context data characterizing a state of the client system;
      assigns the incident message to an appropriate key user based on the context data;
      routes the incident message to the appropriate key user; and
      initiates an implementation of a solution to the incident message by the appropriate key user;
   the software maintenance service:
      transmits information describing a change to the software installed on the client system to a back-end system;
      receives at least one update recommendation from the back-end system based on the transmitted information;
      initiates the automatic downloading of at least one software update associated with the update recommendations in response to a trigger event detected by the client system; and
      automatically deploys the software updates; and
   the continuous improvement service comprises:
      transmits information describing the client system to a back-end system;
      receives, from the back-end system, at least one recommended action to improve an efficiency of the client system, the recommended action based on a predefined benchmark; and
      implements the at least one received recommended actions.

2. The computer-implemented method of claim 1, wherein each generated event indicates a change in an operational parameter of one of a plurality of components of the client system.

3. The computer-implemented method of claim 1 wherein determining whether the received event has an associated predefined task comprises:
   retrieving a plurality of predefined events, each predefined event associated with at least one predefined task needed to resolve the associated predefined event;
   determining, for each received event, whether the received event is a predefined event; and
   associating, for each received event, the at least one predefined task with the received event that is a predefined event.

4. The computer implemented method of claim 1, wherein initiating a generation of a system incident message for each received event not having an associated predefined task comprises:
   automatically collecting context data associated with each received event;
   generating, for each received event, an incident report based on the collected context data; and
   generating, for each incident report, an incident service request based on the generated incident report.

5. The computer-implemented method of claim 1, wherein the support service to handle at least one of a system incident message and a user incident message further comprises: routing a solution message notifying the end user of a solution to the incident message generated by the end user.

6. The method of claim 1, wherein the software maintenance service to automatically deploy at least one software update to the software installed on the client system further comprises automatically preparing the client system for deploying the downloaded software updates.

7. The method of claim 6, wherein automatically preparing the client system for deploying the downloaded software updates comprises:
   automatically checking for prerequisite tasks;
   providing notification of the prerequisite tasks; and
   providing instructions for manually performing the prerequisite tasks.

8. The computer-implemented method of claim 1, wherein the at least one recommended action to improve an efficiency of the client system from the back-end system is based on an analysis of the transmitted information, the analysis including an identification of an improved use for at least one client system resource, based on the predefined benchmark.

9. The computer-implemented method of claim 1, wherein displaying the aggregated information in a graphical user interface comprises: displaying the aggregated information in a work list associated with a user based on a service level agreement.

10. A system for managing software, the system comprising:
   a plurality of client computer systems, each client computer system comprising a processor, a display device, a network interface, an input device, and a computer readable medium;
   a computer program product stored on the computer readable medium of at least one of the client computer systems, the stored computer program product including executable instructions causing the at least one client computer system to:
      initiate at least two embedded services integrated with an enterprise software product stored on the computer readable medium based on a service level agreement, wherein the embedded services comprise i) a health check monitoring service to automatically trigger one of a system incident message and an administrative task message in response to a generated event, ii) a support service to handle at least one of a system incident message and a user incident message, iii) a software maintenance service to automatically deploy at least one software update to the software installed on the client system, and iv) a continuous improvement service to implement at least one recommended action to improve an efficiency of the client system;
   aggregate information outputted from the initiated embedded services; and
   display the aggregated information in a graphical user interface
   wherein the health check monitoring service:
      selectively recognizes one or more generated events, each generated event being received if the event triggers at least one predetermined logical rule;
      determines, for each received event, whether the received event has an associated predefined task;
      initiates a generation of a system incident message for each received event not having an associated predefined task; and
      initiates a generation of an administrative task for each received event having an associated predefined task;
   the support service comprises:
      receives an incident message generated by at least one of a client system resource and an end user, the incident message including collected context data characterizing a state of the client system;
      assigns the incident message to an appropriate key user based on the context data;
      routes the incident message to the appropriate key user; and
      initiates an implementation of a solution to the incident message by the appropriate key user;
   the software maintenance service comprises:
      transmits information describing a change to the software installed on the client system to a back-end system;
      receiving at least on update recommendation from the back-end system based on the transmitted information;
      initiates the automatic downloading of at least one software update associated with the update recommendations in response to a trigger event detected by the client system; and
      automatically deploys the software updates; and
   the continuous improvement service comprises:
      transmits information describing the client system to a back-end system;
      receives, from the back-end system, at least one recommended action to improve an efficiency of the client system, the recommended action based on a predefined benchmark; and
      implements at least one received recommended action.

11. The system of claim 10, wherein each generated event indicates a change in an operational parameter of one of a plurality of components of one of the plurality of client computer systems.

12. The system of claim 10, wherein the executable instructions causing the at least one client computer system to determine, for each received event, whether the received event has an associated predefined task comprises executable instructions that cause the at least one client computer system to:
   retrieve a plurality of predefined events, each predefined event associated with at least one predefined task needed to resolve the associated predefined event;
   determine, for each received event, whether the received event is a predefined event; and
   associate, for each received event, the at least one predefined task with the received event that is a predefined event.

13. The system of claim 10, wherein the executable instructions causing the at least one client computer system to initiate a generation of a system incident message for each received event not having an associated predefined task comprises executable instructions that cause the at least one client computer system to:
   automatically collect context data associated with each received event;
   generate, for each received event, an incident report based on the collected context data; and
   generate, for each incident report, an incident service request based on the generated incident report.

14. The system of claim 10, wherein the at least one recommended action to improve an efficiency of the client systems from the back-end system is based on an analysis of the transmitted information, the analysis including an identification of an improved use for at least one client system resource, based on the predefined benchmark.

15. The system of claim 10, wherein the executable instructions causing the at least one client computer system to display the aggregated information in a graphical user interface comprises executable instructions that cause the at least one client computer system to:
  associate the aggregated information with at least one view of a graphical user interface associated with a user; and
  display the aggregated information in a selected one of the at least one views of the graphical user interface.

16. The system of claim 10, wherein the executable instructions causing the at least one client computer system to display the aggregated information in a graphical user interface comprises executable instructions that cause the at least one client computer system to: display the aggregated information in a work list associated with a user based on the service level agreement.

17. A computer-implemented method of managing software installed on a client system, the method steps performed by at least one processor and comprising:
  providing back-end server support for an embedded health check monitoring service integrated with the software, comprising:
    receiving, from the client system, at least one event incident message generated by the embedded health check monitoring service, the event incident message generated in response to an event detected by the client system and a determination, by the client system, that the detected event has an associated predefined task, the event incident message including context data collected by the client system, the context data relating to the detected event; and
    generating, and storing in memory, a service request relating to the received event incident message, the stored service request accessible to an administrator for the client system;
  providing back-end server support for an embedded support service integrated with the software, comprising:
    receiving, from the client system, at least one system incident message generated by the embedded support service, the system incident message generated in response to a message reporting an incident received at the support service, the system incident message including context data collected from the client system in connection with the incident, the context data characterizing a state of the client system;
    processing the incident message to determine a resolution for the incident message, based at least in part on the context data; and
    transmitting a resolution message to the client system including at least one task, to be performed by the client system, in implementing the determined resolution;
  providing back-end server support for an embedded software maintenance service integrated with the software, comprising:
    receiving, from the client system, an update status message generated by an embedded software maintenance service, the update status message including data describing a change to the software installed on the client system;
    determining at least one update recommendation in response to and based at least in part on the update status message, the update recommendation associated with at least one software update available for download by the client system in response to a trigger event detected by the client system; and
    transmitting the at least one update recommendation to the client system;
  providing back-end server support for an embedded continuous improvement service integrated with the software, comprising:
    receiving, from the client system, at least one efficiency improvement message generated by an embedded continuous improvement service integrated with the software, the efficiency improvement message including information describing the client system and at least one client system resource;
    analyzing the information describing the client system to identify at least one improved use of the at least one client system resource based on a predefined benchmark;
    determining, based at least in part on the identification of the improved use for the system resource, at least one recommended action to improve an efficiency of the client system when implemented by the client system; and
    transmitting the at least one recommended action to the client system.

18. The method of claim 17, wherein each method step is performed by at least one of a plurality of processors within a distributed computing environment.

19. The method of claim 17, wherein the event incident message indicates a change in an operational parameter of one of a plurality of components of the client system.

20. The method of claim 17, wherein communications received from and transmitted to the client system are communicated through a channel dedicated for communication with the client system.

* * * * *